(12) United States Patent
Noh et al.

(10) Patent No.: US 8,279,909 B2
(45) Date of Patent: Oct. 2, 2012

(54) METHOD FOR TRANSMITTING INFORMATION USING SEQUENCE

(75) Inventors: Min Seok Noh, Gumi-Si (KR); Seung Hee Han, Gumi-Si (KR); Yeong Hyeon Kwon, Gumi-Si (KR); Hyun Hwa Park, Gumi-Si (KR); Hyun Woo Lee, Gumi-Si (KR); Dong Cheol Kim, Gumi-Si (KR); Jin Sam Kwak, Gumi-Si (KR)

(73) Assignee: LG Electronics Inc., Seoul (KR)

( * ) Notice: Subject to any disclaimer, the term of this patent is extended or adjusted under 35 U.S.C. 154(b) by 553 days.

(21) Appl. No.: 12/442,922

(22) PCT Filed: Sep. 21, 2007

(86) PCT No.: PCT/KR2007/004676
§ 371 (c)(1),
(2), (4) Date: Dec. 24, 2009

(87) PCT Pub. No.: WO2008/038979
PCT Pub. Date: Apr. 3, 2008

(65) Prior Publication Data
US 2010/0091907 A1    Apr. 15, 2010

Related U.S. Application Data

(60) Provisional application No. 60/827,022, filed on Sep. 26, 2006, provisional application No. 60/847,780, filed on Sep. 27, 2006, provisional application No. 60/828,759, filed on Oct. 9, 2006, provisional application No. 60/829,742, filed on Oct. 17, 2006, provisional application No. 60/885,718, filed on Jan. 19, 2007.

(30) Foreign Application Priority Data

Jan. 4, 2007   (KR) .................. 10-2007-0000947
Mar. 9, 2007  (KR) .................. 10-2007-0023748
Aug. 9, 2007  (KR) .................. 10-2007-0080297

(51) Int. Cl.
*H04B 1/00* (2006.01)
(52) U.S. Cl. ........ 375/146; 375/302; 375/342; 375/295; 375/140; 375/130
(58) Field of Classification Search .................. 375/146, 375/302, 342, 295, 140, 130
See application file for complete search history.

(56) References Cited

U.S. PATENT DOCUMENTS 5,583,884 A    12/1996   Maruyama et al.
(Continued)

FOREIGN PATENT DOCUMENTS

CN    1350380 A    5/2002
(Continued)

OTHER PUBLICATIONS

Bahl, et al., "Comparison of Initial Cell Search Algorithms for W-CDMA Systems Using Cyclic and Comma Free Codes," *The 2002 45th Midwest Symposium on Circuits and Systems*, Conference Proceedings, Aug. 4-7, 2002, vol. 3, pp. 192-195.

*Primary Examiner* — Kenneth Lam
(74) *Attorney, Agent, or Firm* — Birch, Stewart, Kolasch & Birch, LLP

(57) ABSTRACT

A method for transmitting information using a sequence is disclosed. According to an embodiment, the method includes the steps of generating a sequence for transmitting data or control signals, performing phase modulation for indicating additional information on partial elements among a plurality of elements configuring the sequence, and transmitting the phase modulated sequence.

11 Claims, 24 Drawing Sheets

U.S. PATENT DOCUMENTS

| | | | |
|---|---|---|---|
| 7,583,981 B2 * | 9/2009 | Suzuki | 455/562.1 |
| 7,907,906 B2 * | 3/2011 | Murata et al. | 455/67.13 |
| 2002/0048315 A1 * | 4/2002 | Hanada et al. | 375/145 |
| 2004/0141458 A1 | 7/2004 | Park et al. | |
| 2005/0111522 A1 * | 5/2005 | Sung et al. | 375/145 |
| 2005/0201475 A1 * | 9/2005 | Alcouffe | 375/260 |
| 2006/0035664 A1 * | 2/2006 | Murata et al. | 455/550.1 |
| 2006/0050799 A1 * | 3/2006 | Hou et al. | 375/260 |
| 2007/0140106 A1 * | 6/2007 | Tsai et al. | 370/208 |
| 2007/0183306 A1 * | 8/2007 | Akita et al. | 370/208 |
| 2007/0270273 A1 * | 11/2007 | Fukuta et al. | 475/206 |
| 2008/0013516 A1 * | 1/2008 | Zhang et al. | 370/342 |
| 2009/0196271 A1 | 8/2009 | Song | |

FOREIGN PATENT DOCUMENTS

| | | |
|---|---|---|
| CN | 1658534 A | 8/2005 |
| EP | 0 245 868 A2 | 11/1987 |
| EP | 1 199 820 A2 | 4/2002 |
| EP | 1 401 114 A2 | 3/2004 |
| JP | 1-151335 A | 6/1989 |
| JP | 7-170210 A | 7/1995 |
| JP | 9-98153 A | 4/1997 |
| JP | 2002-135167 A | 5/2002 |
| WO | WO-2004/073224 A1 | 8/2004 |
| WO | WO-2006/002550 A1 | 1/2006 |
| WO | WO-2007/139305 A2 | 12/2007 |

* cited by examiner

FIG. 5

| | S-SCH1 | S-SCH2 |
|---|---|---|
| Possible range of indices (Zadoff-Chu sequence) | | |
| Example | 0~35 | 0~35 |
| | 0 | 36 |
| | 0 | 37 |
| | 1 | 36 |
| | 1 | 37 |
| | ⋮ | ⋮ |
| | 35 | 36 |
| | 35 | 37 | ns

METHOD FOR TRANSMITTING INFORMATION USING SEQUENCE

This application is the National Phase of PCT/KR2007/004676 filed on Sep. 21, 2007, which claims priority under 35 U.S.C.119(e) to U.S. Provisional Application Nos. 60/827,022 filed on Sep. 26, 2006, 60/847,780 filed on Sep. 27, 2006, 60/828,759 filed on Oct. 9, 2006, 60/829,742 filed on Oct. 17, 2006 and 60/885,718 filed on Jan. 19, 2007 and under 35 U.S.C. 119(a) to Patent Application No. 10-2007-0000947 filed in the Republic of Korea on Jan. 4, 2007, 10-2007-0023748 filed in the Republic of Korea on Mar. 9, 2007, and 10-2007-0080297 filed in the Republic of Korea on Aug. 9, 2007, all of which are hereby expressly incorporated by reference into the present application.

TECHNICAL FIELD

The present invention relates to a method for transmitting information using sequence, and more particularly, to a method for configuring a channel using sequences of excellent performance and transmitting information through such channel.

BACKGROUND ARTS

OFDM, OFDA, and SC-FDMA methods that are used in the present invention will now be described in detail.

The demand for high speed data transmission has recently been increasing, and, being advantageous in high speed transmission, the OFDM method has been selected as an adequate transmission method in various types of high speed transmission systems.

Hereinafter, OFDM (orthogonal frequency division multiplexing) will be described in detail. The basic principles of OFDM corresponds to dividing a high-rate data stream into a plurality of slow-rate data streams, thereby simultaneously transmitting the slow-rate data streams by using a plurality of carrier waves. Each of the carrier waves is referred to as a subcarrier. Due to an orthogonality existing between each carrier wave of the OFDM method, a receiving end may detect a carrier wave frequency element even when the carrier wave frequency elements are overlapped with one another. The high-rate data stream passes through a serial to parallel converter so as to be converted into a plurality of slow-rate data streams. Then, a subcarrier is multiplied to each of the converted data streams. Subsequently, each of the data streams is added and then transmitted to the receiving end. The OFDMA corresponds to a multiple access method allocating subcarriers to an entire band in accordance with a transmission rate required by multiple users in the above-described OFDM.

Hereinafter, a related art SC-FDMA (Single Carrier-FDMA) method will be described. The SC-FDMA method is also referred to as a DFT-S-OFDM method. The related art SC-FDMA method is a method that is generally applied to uplinks. Prior to generating an OFDM signal, the related art SC-OFDM method adopts a process of spreading symbols by using a DFT matrix in a frequency domain. Thereafter, the result of the spreading process is demodulated by using the related art OFDM method, thereby being transmitted. The following variables will be defined in order to describe the SC-FDMA method. N represents a number of subcarriers transmitting an OFDM signal, and Nb indicates a number of subcarriers for an arbitrary user. F signifies a discrete fourier transform matrix, i.e., DFT matrix. s indicates a data symbol vector, x represents a vector having data dispersed in the frequency domain, and y signifies an OFDM symbol vector being transmitted in a time domain.

In the SC-FDMA method, a data symbol (s) is dispersed by using the DFT matrix before being transmitted. This process is represented by Equation 1 shown below.

$$x = F_{N_b \times N_b} s \quad \text{[Equation 1]}$$

In Equation 1, $F_{N_b \times N_b}$ represents a DFT matrix having the size of Nb and used for dispersing the data symbol (s). A subcarrier mapping process is performed on the vector (x), which is dispersed as described above, by using a method of equally allocating subcarriers, thereby converting the vector (x) to a time domain by using an IDFT module, thereby obtaining a signal that is to be transmitted to a receiving end. The transmission signal that is transmitted to the receiving end is represented by Equation 1 shown below.

$$y = F^{-1}_{N \times N} x \quad \text{[Equation 2]}$$

$In Equation 2, $F^{-1}_{N \times N}$ represents a DFT matrix having the size of N and used for converting a frequency domain signal to a time domain signal. A cyclic prefix is inserted in the signal y and then transmitted, the signal y being generated by using the above-described method. The method of generating a transmission signal by using the above-described method and then transmitting the generated signal to the receiving end is referred to as the SC-FDMA method. Herein, the size of the DFT matrix may be diversely controlled with respect to a plurality of specific purposes.

The description presented above is based upon a DFT or IDFT calculation. However, for simplicity, in the following description, a DFT (Discrete Fourier Transform) or FFT (Fast Fourier Transform) calculation will be used without any particular indication. If the number of input values of the DFT calculation is equal to a power of 2, it is apparent to those skilled in the art that the FFT calculation may be used instead of the DFT calculation. Therefore, in the following description, the contents related to the FFT calculation may also be equally applied to the DFT calculation.

Hereinafter, a sequence used in a 3GPP (3$^{rd}$ Generation Partnership Project) LTS (Long Term Evolution) technology, which has recently been proposed as a new technology, will be described. A wide range of sequences is also used in the LTE system. Hereinafter, a sequence used in a channel of the LTE system will now be described. Generally, in order to communicate with a base station, a terminal first performs synchronization with the base station through a synchronization channel (hereinafter referred to as 'SCH') and then performs cell search.

A series of process for performing synchronization with the base station and acquiring a cell ID of the corresponding terminal is referred to as a cell search. Generally, the cell search may be divided into an initial cell search which is performed when an initial terminal has turned its power on, and a neighbor cell search which performed for searching a neighboring base station of a terminal in a connection or idle mode.

The SCH (Synchronization Channel) may be configured to have a hierarchical structure. For example, a P-SCH (Primary-SCH) and a S-SCH (Secondary-SCH) may be used. Herein, the P-SCH and the S-SCH may be included in a radio frame by using diverse methods. FIG. 1 and FIG. 2 illustrate a plurality of methods by which the P-SCH and the S-SCH are included in a radio frame. In the LTS system, depending upon various circumstances, the SCH may be configured in accordance with the structures shown in FIG. 1 and FIG. 2.

Referring to FIG. 1, the P-SCH is included in the last OFDM symbol of the first sub-frame. And, the S-SCH is included in the last OFDM symbol of a second sub-frame. Meanwhile, referring to FIG. 2, the P-SCH is included in the last OFDM symbol of the first sub-frame. And, the S-SCH is included in the second last OFDM symbol of the first sub-frame.

The LTE system may use the P-SCH to acquire time and frequency synchronization. Additionally, a cell group ID, a frame synchronization information, an antenna configuration information, and so on, may be included in the S-SCH. Hereinafter, the method of configuring the S-SCH proposed in the related art 3GPP LTE system will now be described in detail.

Referring to FIG. 1 and FIG. 2, two S-SCHs are included in one radio frame, and, preferably, each of the two S-SCHs corresponds to a different sequence. Also, it is preferable that the amount of information that is to be included in a S-SCH is equal to 1020 units (or types). More specifically, a 1-bit information for frame synchronization (i.e., frame synch), a 8-bit information representing the cell group ID, and a 2-bit information indicating a transmission antennae through which signals are being transmitted are included in the S-SCH. 2 different types of 1-bit information, 170 different types of 8-bit information, and 3 different types of 2-bit information may be indicated. In other words, 2*170*3=1020 different types of information may be indicated.

Although, the example of the particular number of information sets included in the S-SCH has been proposed to be equal to 1020, the description does not suggest or propose in detail as to how the information will be represented. Hereinafter, the synchronization channel of an IEEE 802.16e system will now be described in detail. When using the OFDMA-based IEEE 802.16e system, a preamble configured of one OFDM symbol is first transmitted for each downlink frame. The preamble is provided to a telecommunication terminal for diverse purposes such as synchronization, cell search, and channel estimation in a telecommunication system.

FIG. 3 illustrates a structure of a downlink sub frame in the IEEE 802.16 system. Referring to FIG. 3, the preamble, which is configured of one OFDM symbol, is transmitted in each frame preceding the other signals. Herein, the preamble is used for diverse purposes, such as time and frame synchronization, cell search, channel estimation, and so on.

FIG. 4 illustrates a group of subcarriers transmitting a preamble, which is being transmitted from a $0^{th}$ sector, in the IEEE 802.16 system. Herein, part of both ends of a given bandwidth is used as a guard band. In addition, when the number of sector is equal to 3, each sector inserts a sequence for each 3 subcarriers, and 0 is inserted in the remaining subcarriers.

Hereinafter, a related art sequence used in the preamble will now be described. The sequence being used in the preamble is shown in Table 1 below.

words, the proposed hexadecimal number sequence is converted to a binary number sequence (Wk). Then, the Wk is mapped from the MSB (Most Significant Bit) to the LSB (Leas Significant Bit). At this point, 0 is mapped to +1, and 1 is mapped to −1. (For example, in a $0^{th}$ segment having an index of 0, since the Wk corresponding to the hexadecimal number 'C12' is 110000010010 . . . , the converted binary code value becomes −1 −1 +1 +1 +1 +1 +1 −1 +1 +1 −1 +1 . . . )

The sequence of the related art corresponds to a sequence searched by a computer simulation. This sequence corresponds to a sequence among a plurality of sequence types that may be configured by using binary codes, the being capable of comparatively maintaining Correlation characteristics and, at the same time, maintaining a PAPR (Peak-to-Average Power Ratio) at a low level when being converted to the time domain.

Meanwhile, in a more evolved (or upgraded) system type, such as an IEEE 802.16m system, the synchronization channel identical to that of the IEEE 802.16e system may be applied herein, and the purposes may also be the same. However, details as to how to represent the synchronization channel remain undefined in such upgraded version of the IEEE 802.16 system as well.

DISCLOSURE OF INVENTION

An object of the present invention devised to solve the problem lies on proposing a method of configuring a channel indicating a specific number of information sets.

Another object of the present invention devised to solve the problem lies on proposing a method of including diverse information in a channel including a synchronization channel by using a sequence having excellent performance.

The object of the present invention can be achieved by providing an enhanced method for transmitting information using a sequence according to an embodiment of the present invention. More specifically, according to this embodiment, the method may include the steps of generating a sequence for transmitting data or control signals, performing phase modulation for indicating additional information on partial elements among a plurality of elements configuring the sequence, and transmitting the phase modulated sequence.

In another aspect of the present invention, provided herein is an enhanced method for transmitting information using a synchronization channel according to another embodiment of the present invention. More specifically, according to this embodiment, the method may include the steps of applying a predetermined sequence to each of a first synchronization channel and a second synchronization channel, performing

TABLE 1

| Index | IDcell | Sector | Sequence (Hexadecimal numbers) |
|-------|--------|--------|--------------------------------|
| 0 | 0 | 0 | A6F294537B285E1844677D133E4D53CCB1F182DE0 0489E53E6B6E77065C7EE7D0ADBEAF |
| 1 | 1 | 0 | 668321CBBE7F462E6C2A07E8BBDA2C7F7946D5F69 E35AC8ACF7D64AB4A33C467001F3B2 |
| 2 | 2 | 0 | 1C75D30B2DF72CEC9117A0BD8EAF8E0502461FC07 456AC906ADE03E9B5AB5E1D3F98C6E |
| ... | ... | ... | ... |

Herein, the sequence is decided by the sector number and the IDcell parameter value. Each of the defined sequences is converted to a binary signal in an increasing order, so as to be mapped to the subcarrier by using BPSK modulation. In other phase modulation for indicating additional information on sequence elements corresponding to each of a first region of the first synchronization channel and a second region of the second synchronization channel, and transmitting the first synchronization channel and the second synchronization channel each having the respective phase modulated sequence applied thereto.

Furthermore, in the above-described embodiments, the synchronization channel having sequences applied thereto may correspond to a synchronization channel or a preamble of an IEEE 802.16 system.

Herein, it is preferable that the synchronization channel corresponds to a secondary synchronization channel (S-SCH), and the sequence used herein may correspond to a sequence having excellent characteristics may include a CAZAC sequence, a Hadamard sequence, a maximum length sequence (M-sequence), a computer search sequence, and a PN sequence.

Furthermore, the additional information being transmitted according to the above-described embodiments, may consist of at least any one of control information on a frequency hopping of a downlink reference signal, boundary information of a predetermined frame, and antenna configuration information.

Advantageous Effects of Invention

When configuring a channel for synchronization according to the present invention, diverse information may be included in the channel used for synchronization. Thus, diverse information may be supplied to a receiving end, thereby contributing to the acquisition of synchronization.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 5 illustrates Example 2 of Method 1 according to the present invention.

BEST MODE FOR CARRYING OUT THE INVENTION

Reference will now be made in detail to the preferred embodiments of the present invention, examples of which are illustrated in the accompanying drawings.

Hereinafter, the first embodiment of the present invention corresponds to a method including a specific number of information sets in a plurality of channels including a synchronization channel. And, the second embodiment of the present invention corresponds to a method of including information on a hopping option.

First Embodiment

Figure 1:
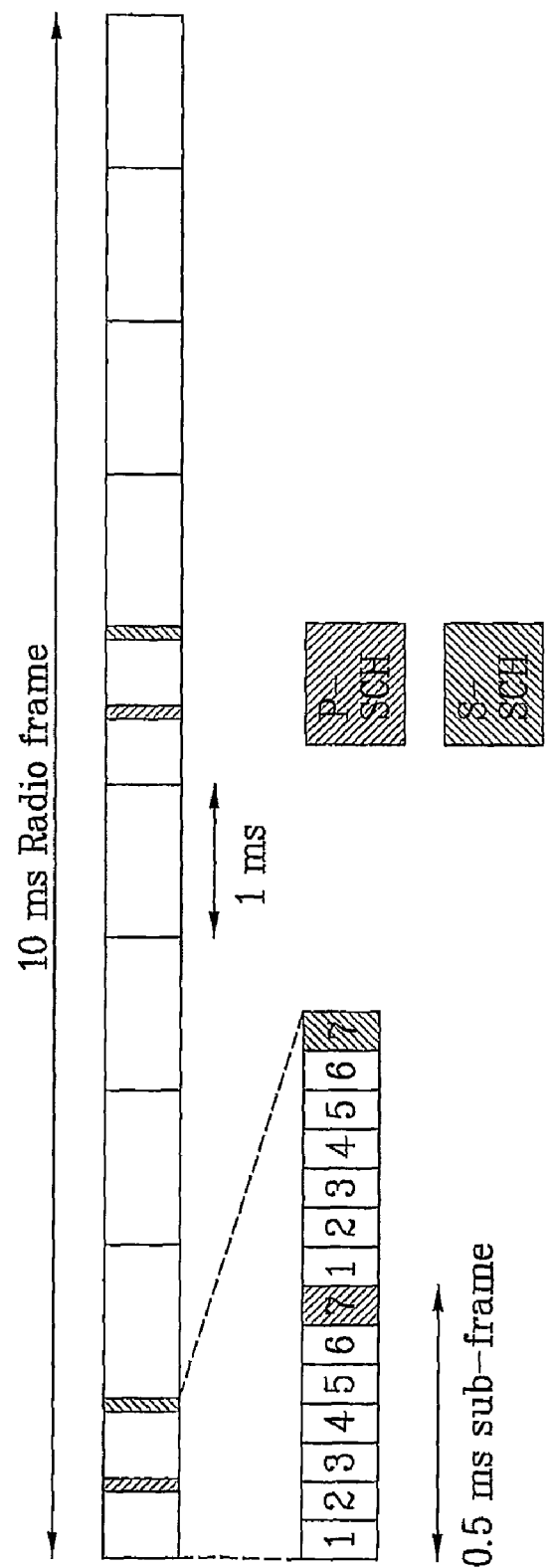
FIG. 1 and FIG. 2 illustrate a plurality of methods by which the P-SCH and the S-SCH are included in a radio frame.
Figure 2:
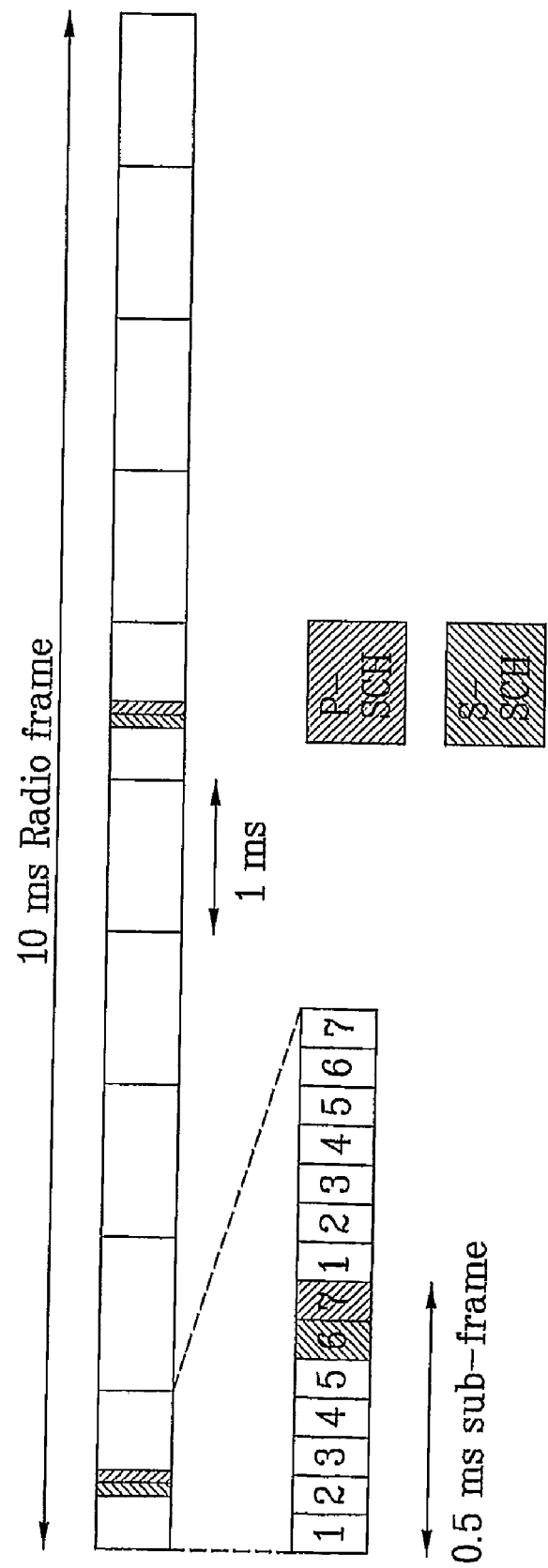
Figure 3:
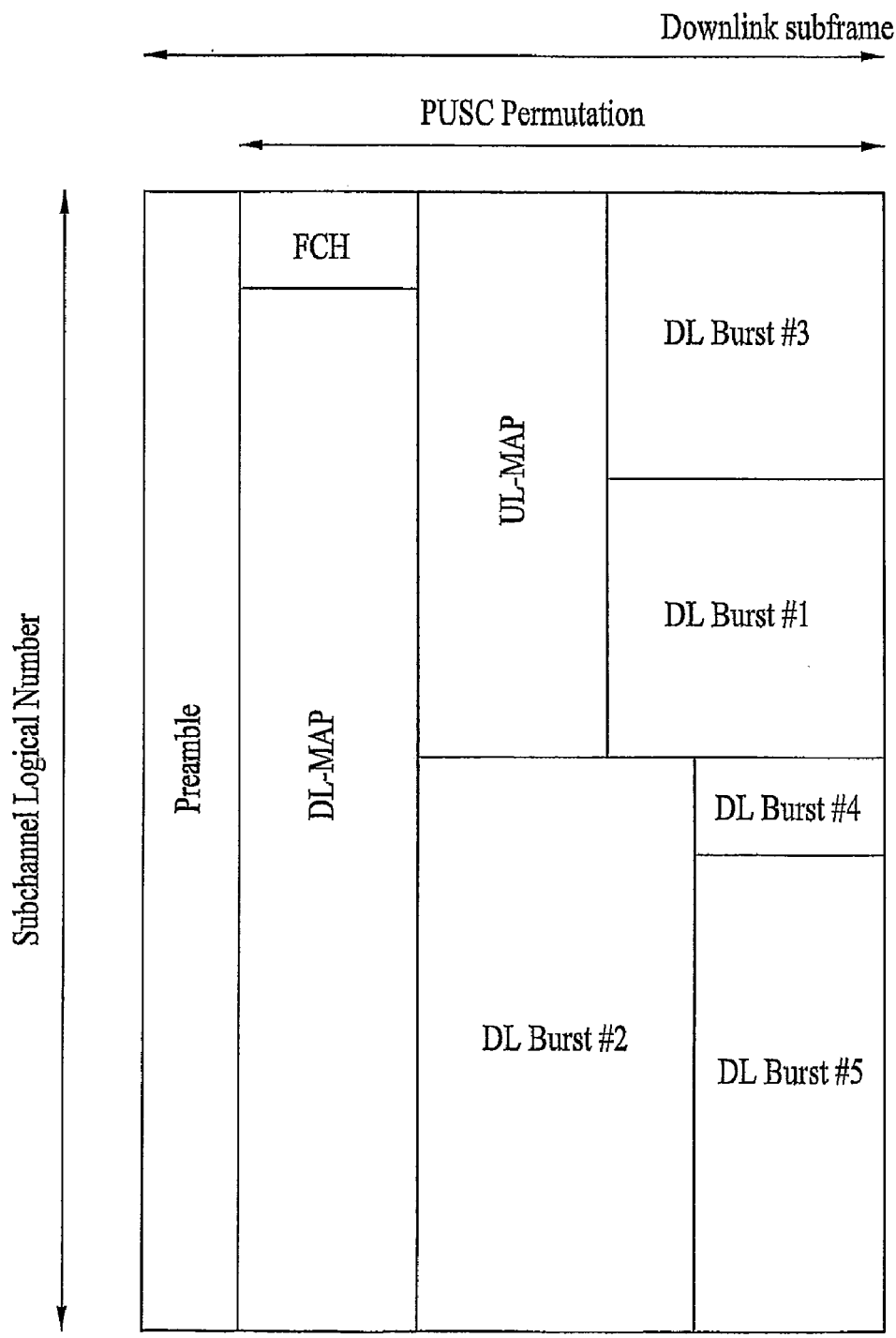
FIG. 3 illustrates a structure of a downlink sub frame in the IEEE 802.16 system.
Figure 4:
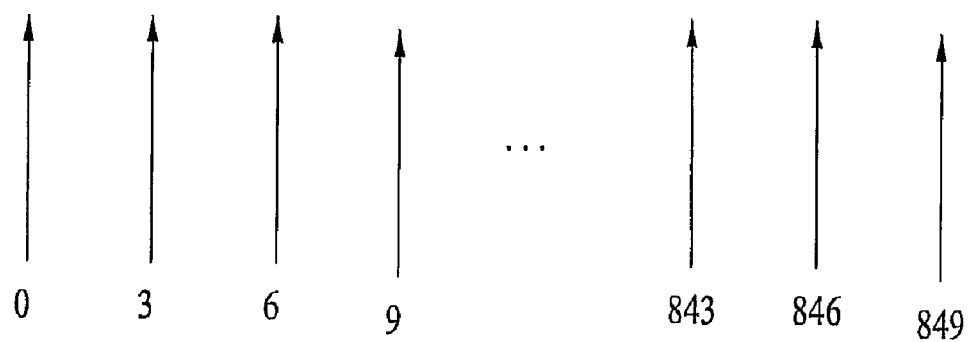
FIG. 4 illustrates a group of subcarriers transmitting a preamble, which is being transmitted from a $0^{th}$ sector, in the IEEE 802.16 system.

The first embodiment proposes a method of including a specific number of information sets in a channel used for synchronization. It is preferable that that the channel used for synchronization is a P-SCH or a S-SCH. If the system is not configured of two different types of SCH, such as P-SCH/S-SCH, and configured of only one type of SCH, it is preferable to apply the information to the corresponding SCH. Herein, the first embodiment relates to a method of including a particular number of information sets to at least one S-SCH. Referring to FIG. 1 and FIG. 2, two S-SCHs are included in one radio frame. Hereinafter, an example of including a particular number of information sets in two S-SCHs will be described for simplicity. Also, among the two S-SCHs, the first S-SCH will be referred to as 'S-SCH 1', and the second S-SCH will be referred to as 'S-SCH 2'.

However, in a particular embodiment, a method of dividing each of the two S-SCHs included in the 1 radio frame into 2 portions and applying 2 sequences by logically considering each portion as the two S-SCHs, respectively, may also be proposed. Therefore, as described above, it is assumed that each of the 2 S-SCHs may be logically classified to represent 2 S-SCHs as units for applying 2 sequences.

This embodiment describes a method of including a particular number of information sets in the S-SCH by using 5 different methods. In this case, it is preferable to combine at least 2 sequences, in order to increase the number of information sets that are to be included. However, the present invention is not necessarily required to be limited to this.

This embodiment uses a first sequence according to a scrambling code, a second sequence according to an orthogonal sequence modulation, and a modulation method according to a phase rotation on a constellation map. However, a maximum length sequence (hereinafter referred to as a "M-sequence") may also be taken into consideration as a sequence being applied to the S-SCH. And, when it is assumed that the M-sequence is being considered as the S-SCH, the M-sequence is used without distinction of the first sequence or the second sequence. Furthermore, a form using a modulation method according to a phase rotation of the M-sequence may also be taken into consideration.

Meanwhile, as a form of the first embodiment, the first sequence may correspond to a sequence of a CAZAC (constant amplitude & zero autocorrelation) series. For example, a Zadoff-Chu sequence may be used as the CAZAC sequence. Herein, sequences of the CAZAC series are known to be sequences having excellent characteristics. The CAZAC sequence may generate a plurality of different sequence types depending upon the size of each sequence index. Then, the generated sequences cross one another at right angles. Therefore, by adjusting the size of each sequence index, each sequence may represent L number of information sets, respectively.

Furthermore, the second sequence may correspond to a delayed CAZAC sequence. The delayed CAZAC sequence refers to a method of generating a sequence by performing a circular delay in the time domain on a particular sequence. The delayed CAZAC sequence may also be referred to as a circular shifted CAZAC sequence.

When a circular delay is performed on a sequence in the time domain, a phase rotation occurs in the frequency domain. For example, a sequence having frequency domain values of 1, 1, 1 may exist. In this case, when circular delay is performed on the corresponding sequence in the time domain by a first delay value, the frequency domain values may become 1, 1exp(j2π/3), 1exp(j4π/3). In addition, when circular delay is performed on the corresponding sequence in the time domain by a second delay value, the frequency domain value may become 1, 1exp(j4π/3), 1exp(j2π/3). In this case, since the 1, 1, 1 sequence, the 1, 1exp(j2π/3), 1exp(j4π/3) sequence, and the 1, 1exp(j4π/3), 1exp(j2π/3) sequence cross one another at a right angle, each of the 3 sequences may indicate 3 different information sets, respectively.

The second sequence may correspond to a Walsh code. The Walsh code may be generated by a Hadamard matrix. For example, a sequence based upon a Walsh code having the length of 4 codes may include 1,1,1,1, 1,−1,1,−1, 1,1,−1,−1, and 1, −1, −1,1. In this case, 4 different types of information may be identified by 4 sequences. When the Walsh code is multiplied by S-SCH 1 or S-SCH 2, a S-SCH 1 or a S-SCH 2 representing 4 different types of information may be configured.

In other words, M number of different information sets may be indicated by the second sequence. However, as described above, as another form of the present invention, the sequence used for S-SCH may all correspond to the M-sequence. The M-sequence corresponds to a type of pseudorandom binary sequence, which may be generated by using a maximum linear feedback shift register. Accordingly, when all sequences used for the S-SCH correspond to the M-sequence, the M-sequence may be equally used for both the first and second sequences, thereby indicating L*M number of information sets corresponding to the above-described configuration. Hereinafter, in the embodiment of the present invention, the L*M number of information sets will be represented as P (=L*M) number of information sets.

Meanwhile, N number of different information sets may be represented by using a modulation method in accordance with a phase rotation on the constellation map. Herein, the modulation method in accordance with a phase rotation on the constellation map corresponds to a method of rotating once again the phase of a signal that has already been processed with constellation mapping. More specifically, the modulation method in accordance with a phase rotation on the constellation map relates to a rotated constellation rotating a constellation. For example, in case of a BPSK symbol of the related art, the BPSK symbol exists at a 0° point and a 180° point of the constellation map. Herein, the phase of such BPSK symbol may be rotated to a predetermined angle so as to indicate N number of different information sets.

For example, when 4 information sets (i.e., a 2-bit unit information) are to be additionally included, any one of the 4 angles 0°,45°,90°,135° is selected so as to rotate the phase. The receiving end calculates how much the phase has been rotated from the phase of the related art BPSK symbol, thereby being capable of decoding the 4 different information sets. The basic concept of the above-described example may be represented by Equation 3 below.

$$C^i_{S\text{-}SCH}(k) = C^l_{scramble}(k) \cdot C^m_{orthogonal}(k) \cdot C^n_{modulated}(k) \quad \text{[Equation 3]}$$

The modulation method according to the above-described first sequence, second sequence, and phase rotation on the constellation map are all used in Equation 3. Herein, l represents an index of a scramble code (e.g., a CAZAC sequence), m signifies an index of an orthogonal sequence (e.g., a delayed CAZAC sequence), and n indicates an index according to a phase rotation on the constellation map. Furthermore, i represents an index identifying the S-SCH that indicates the particular number of information sets according to the embodiment of the present invention.

As described above, in the embodiment of the present invention, when a Zadoff-Chu sequence is used as the first sequence, a delayed CAZAC sequence is used as the second sequence, and a modulation method according to a phase rotation on the constellation map is used to generate a S-SCH, the process may be represented by Equation 4 shown below.

$$C^i_{S\text{-}SCH}(k) = \exp\left(\frac{j\pi lk(k+1)}{N}\right)\exp\left(\frac{2\pi km}{N_d}\right)\exp\left(2\pi \frac{n}{N_{R.C.}}\right) \quad \text{[Equation 4]}$$

Meanwhile, unlike the above-described embodiment, when the M-sequence is only used as the sequence used in S-SCH, the basic concept required for transmitting information may be described by using Equation 5 shown below.

$$C^i_{S\text{-}SCH}(k) = C^p_{M\text{-}sequence}(k) \cdot C^n_{modulation}(k) \quad \text{[Equation 5]}$$

More specifically, in Equation 5, $C^p_{M\text{-}sequence}(k)$ corresponds to $C^l_{scramble}(k) \cdot C^m_{orthogonal}(k)$ of Equation 3.

Based upon the above description, the present invention will be described in more detail according to 5 different methods.

Method 1

Method 1 proposed in the embodiment of the present invention consists of allocating sequences each having different sequence indices included therein to each of the S-SCH 1 and S-SCH 2. More specifically, part of a possible sequence is used for S-SCH 1, and the remaining part of the sequence is used for S-SCH 2.

For example, when sequence indices exist from 0 to 63, the sequence ID that may be allocated to S-SCH 1 may range from 0 to 31, and the sequence ID that may be allocated to S-SCH 2 may range from 32 to 63. In this case, since S-SCH 1 indicates 32 different information sets, and since S-SCH 2 also indicates 32 different information sets, the total amount of information that may be indicated is equal to 32*32=1024.

Additionally, in light of the receiving end, by receiving and decoding the S-SCH, the frame synchronization may be found. In other words, when referring to the index of the S-SCH, if the corresponding index is equal to or lower than 31, it can be determined that the corresponding S-SCH is S-SCH 1. On the other hand, if the corresponding index is equal to or greater than 32, it can be determined that the corresponding S-SCH is S-SCH 2. Therefore, the frame synchronization may be automatically found. Basically, by using the sequence having 0 to 63 indices existing therein according to Method 1, at least 1020 different information sets may be indicated, and the frame synchronization may be found as well.

Since the present invention is not limited by the number of S-SCHs, Method 1 may be applied herein even when only 4

S-SCHs exist. More specifically, in this case, the first of the 4 S-SCHs may be allocated with the $0^{th}$ to $15^{th}$ indices. The second S-SCH may be allocated with the $16^{th}$ to $31^{st}$ indices. The third S-SCH may be allocated with the $32^{nd}$ to $47^{th}$ indices. And, the fourth S-SCH may be allocated with the $48^{th}$ to $63^{rd}$ indices. Thus, by using this method, at least 1020 information sets may be indicated, and the frame synchronization may be found as well.

When using 0 to 63 indices according to the above-described method 1, 1024 information sets may be indicated. If more than 1024 information sets are required to be indicated, the modulation method according to the phase rotation on the constellation map may be used. Also, a larger number of information sets may be indicated by performing a circular transposition on the sequence. Furthermore, when using a CAZAC series sequence, by setting the sequence index as a prime number so as to create (or generate) a sequence, and by using a method of cutting out a portion of the create sequence, thereby being capable of indicating a broader range of information sets.

When at least 1020 information sets are included to the S-SCH according to Method 1, the receiving end decodes all of S-SCH 1 and S-SCH 2 so as to acquire the information included by the receiving end. Hereinafter, Example 1 wherein Method 1 is applied to a Hadamard sequence will be described. It is assumed that the length of the Hadamard sequence is equal to 64.

Example 1 of Method 1

The length and sequence type of the Hadamard sequence are identical to one another. Therefore, if the length of the Hadamard sequence is equal to 64, then a total of 64 sequences are created. When the Hadamard sequence is used as the S-SCH sequence in the frequency domain, a Hadamard sequence corresponding to the indices ranging from 0 to 31 may be used as the sequence of S-SCH 1. Also, a Hadamard sequence corresponding to the indices ranging from 32 to 63 may be used as the sequence of S-SCH 2. At this, the total amount of information included herein is equal to 1024 (=32*32).

It is assumed that two(2) NodeB's (base stations) are included in Example 1 of Method 1. At this point, a Cell ID having the sequence index of NodeB 0=S-SCH 1 index, S-SCH 2 index=1,32, NodeB 1=2,33 may be detected. When the receiving end detects 1,32, this indicates that a Cell ID (or cell group ID) corresponding to NodeB 0 has been detected. And, when the receiving end detects 2,33, this indicates that a Cell ID (or cell group ID) corresponding to NodeB 1 has been detected.

On the other hand, when the receiving end detects 1,2, this evidently indicates that the index of S-SCH1 or S-SCH2 has not been correctly detected. If the receiving end correctly detects an index, the candidate corresponds to an index lower than or equal to 32, an index equal to or greater than 32, or to an index equal to or greater than 32, an index lower than or equal to 32. Therefore, the detected result corresponding to 1,2 may be removed, thereby newly performing the detection process.

When using the above-described method, the amount of calculation may increase. However, a process of deciding a cost function with respect to a possible combination and performing searching by using a soft combining may also be performed. When applying the Hadamard sequence, a PAPR (Peak to Average Power Ratio) problem may occur. Therefore, it is more preferable to perform scrambling with sequences other than the Hadamard sequences, thereby reducing PAPR.

When applying the Hadamard sequence in the present invention, detection should be performed through a channel estimation and compensation process by using a cell-common P-SCH. Thus, the performance of a synchronous network may be degraded (or deteriorated). This corresponds to a characteristic common to all Hadamard sequences. Therefore, when a cell-common P-SCH is estimated as the channel in the synchronous network, a composite channel may be estimated instead of the initial (or original) channel. Hereinafter, Example 2 of Method 1, wherein a CAZAC sequence is applied in the present invention will now be described in detail. Herein, it is assumed that the length of the CAZAC sequence is equal to 73.

Example 2 of Method 1

FIG. 5 illustrates Example 2 of Method 1 according to the present invention. In the example shown in FIG. 5, a Zadoff-Chu sequence having the length of 73 will be used. When applying the CAZAC sequence used in the present invention in this example, it is preferable that the length of the CAZAC sequence is equal to a prime number. This is because when a sequence is created (or generated) by a prime number index based upon the characteristics of the CAZAC sequence, a wider range of sequence types may be created.

Referring to FIG. 5, as described above, S-SCH 1 and S-SCH 2 may each represent two(2) S-SCH's included in one radio frame. Alternatively, each of S-SCH 1 and S-SCH 2 may represent a subject having applying sequences different from one another by logically identifying a particular S-SCH among the two(2) S-SCH's. As shown in FIG. 5, a Zadoff-Chu sequence having an index ranging from a $0^{th}$ index to a $35^{th}$ index is allocated to S-SCH 1. And, a Zadoff-Chu sequence having an index ranging from a $36^{th}$ index to a $71^{st}$ index is allocated to S-SCH 2. In this case, the total amount of information is equal to 1296(=36*36).

The above-described Example 2 of Method 1 is similar to Example 1 in that the Hadamard sequence is used. However, Example 2 is more advantageous in that separate data processing processes are not required for reducing PAPR. More specifically, when using the Zadoff-Chu sequence, the sequence corresponds to one of a CAZAC series sequence. Therefore, a scrambling process for reducing PAPR is not required. Furthermore, in case of using the Zadoff-Chu sequence, the sequence is less sensitive to channel estimation errors. Therefore, the corresponding sequence is not highly influenced by the cell-common P-SCH.

Apart from the above-described Example 1 and Example 2 of Method 1, wherein the Hadamard sequence and the CAZAC sequence are applied to the S-SCH, another example of using an M-sequence may be proposed as Example 3 of Method 1. However, the detailed exemplary process of applying the M-sequence to Method 1 may also be applied in Example 1 and Example 2. Therefore, a detailed description of the same will be omitted for simplicity.

Method 2

Method 2 proposed in the embodiment of the present invention consists of allocating an index having a constant pattern (an index indicating a scrambling code) to S-SCH 1 and S-SCH 2. Method 1 relates to a method of identifying S-SCH 1 and S-SCH 2 in accordance with a corresponding index. However, Method 2 relates to a method of identifying S-SCH 1 and S-SCH 2 by using two(2) index patterns, instead of identifying S-SCH 1 and S-SCH 2 using the corresponding index itself.

Figure 6:
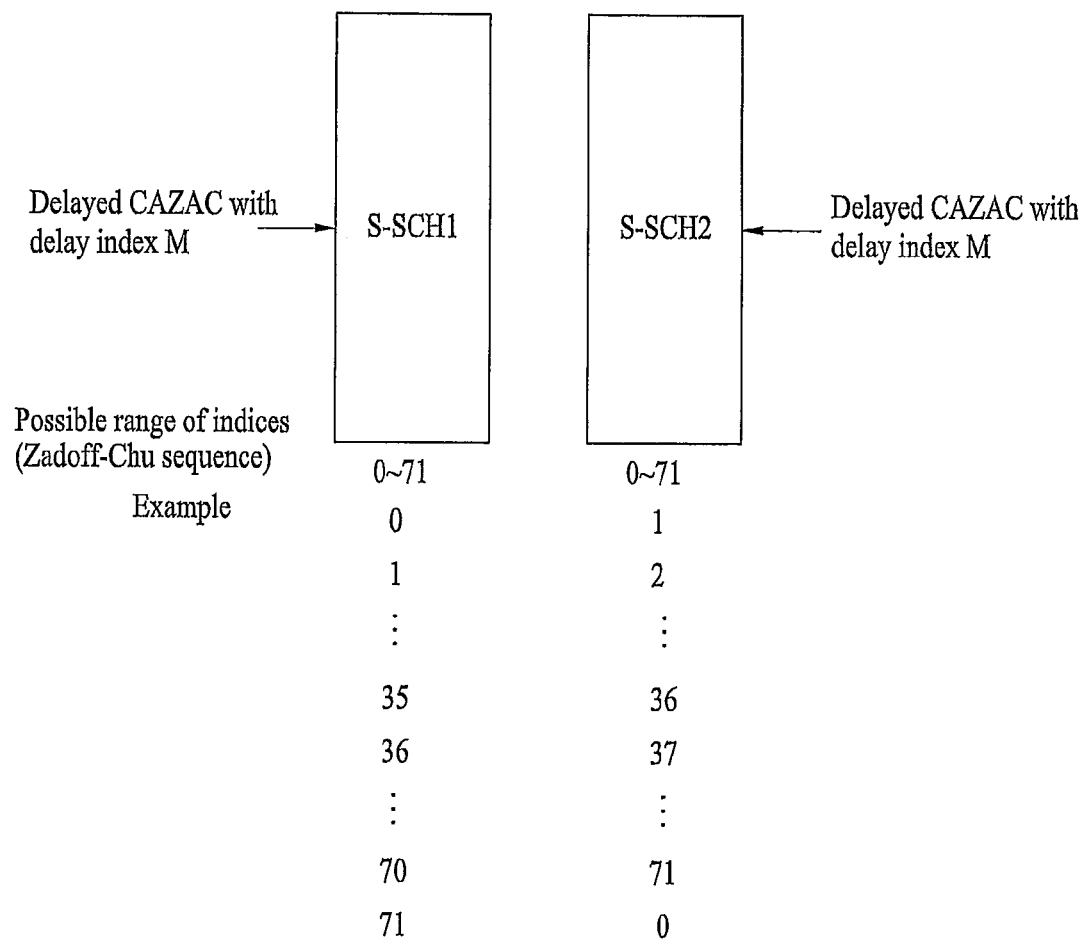
FIG. 6 illustrates a method of allocating an index of a constant pattern to S-SCH 1 and S-SCH2 according to Method 2.

FIG. 6 illustrates a method of allocating an index of a constant pattern to S-SCH 1 and S-SCH 2 according to Method 2. As shown in FIG. 6, S-SCH 1 may be configured by using a scrambling code (e.g., a Zadoff-Chu sequence) created based upon a $0^{th}$ to $71^{st}$ index. Similarly, S-SCH 2 may be configured by using a scrambling code created based upon a $0^{th}$ to $71^{st}$ index. However, as shown in FIG. 6, it is preferable that the indices allocated to both S-SCH 1 and S-SCH 2 are continuous (or serial), and that a smaller pattern is applied to the index allocated to S-SCH 1 as compared to the pattern applied to the index allocated to S-SCH 2.

By using the scrambling code (e.g., a Zadoff-Chu sequence) created based upon a $0^{th}$ to $71^{st}$ index, a total of information sets may be represented. Hereinafter, Example 1 of Method 2 indicates a wider range of information sets by using orthogonal codes, in addition to the scrambling code.

Example 1 of Method 2

An example of indicating L number of information sets according to a CAZAC series sequence and indicating M number of information sets according to a delayed CAZAC sequence will now be described.

In case of the delayed CAZAC sequence, a wide range of delay values may be used. For example, when three(3) different delay values are used, and when a delay is performed in the time domain according to a first delay value, a 1, 1, 1 signal is created in the frequency domain. When a delay is performed in the time domain according to a second delay value, a 1, $\exp 2\pi/3$, $\exp 4\pi/3$ signal may be created in the frequency domain. Furthermore, when a delay is performed in the time domain according to a third delay value, a 1, $\exp 4\pi/3$, $\exp 2\pi/3$ signal may be created in the frequency domain. As described above, if 3 different delay values are used, 3 different types of sequences are created, thereby indicating 3 different information sets.

Herein, the delay value may correspond to an arbitrary (or random) value. For example, when six(6) different delay values are used, and when a delay is performed in the time domain according to a first delay value, a 1, 1, 1 signal is created in the frequency domain. When a delay is performed in the time domain according to a second delay value, a 1, $\exp 2\pi/3$, $\exp 4\pi/3$ signal may be created in the frequency domain. When a delay is performed in the time domain according to a third delay value, a 1, $\exp 4\pi/3$, $\exp 2\pi/3$ signal may be created in the frequency domain. When a delay is performed in the time domain according to a fourth delay value, a 1, $\exp \pi/3$, $\exp 2\pi/3$ signal is created in the frequency domain. When a delay is performed in the time domain according to a fifth delay value, a 1, $\exp 5\pi/3$, $\exp 4\pi/3$ signal may be created in the frequency domain. Furthermore, when a delay is performed in the time domain according to a sixth delay value, a 1, $\exp \pi$, 1 signal may be created in the frequency domain.

When a delayed CAZAC sequence is used, the delay value is set as '8'. And, when 72 Zadoff-Chu sequences are used, a total of 576(=72*8) information sets may be represented through S-SCH 1 and S-SCH 2. When using Example 1 of Method 2 or other examples of Method 2, the receiving end should recover all of S-SCH 1 and S-SCH 2 in order to acquire accurate information. Although both S-SCH 1 and S-SCH 2 should be recovered in order to perform an accurate recovery process in Method 2, the problem of ambiguity that may occur in Method 1 is eliminated in Method 2. Therefore, the performance of Method 2 may be more enhanced than that of Method 1.

As described above, according to Method 1, specific information is recovered by using a combination of sequence indices of S-SCH 1 and S-SCH 2. For example, when a cell ID is transmitted from a synchronous network, cell A may allocate a sequence index '34' to S-SCH 1 and may allocate a sequence index '36' to S-SCH 2. And, cell B may allocate a sequence index '35' to S-SCH 1 and may allocate a sequence index '37' to S-SCH 2. In this case, the receiving end may detect the sequence index '34' through S-SCH 1 and may detect the sequence index '37' through S-SCH 2. In this case, the receiving end may obtain an incorrect cell ID through an incorrect sequence index.

Conversely, when using Method 2, and when cell A allocates a sequence index '34' to S-SCH 1, then cell A may allocate a sequence index '35' to S-SCH 2. Similarly, when cell B allocates a sequence index '36' to S-SCH 1, then cell B may allocate a sequence index '37' to S-SCH 2. In this case, the receiving end may detect the sequence index '34' through S-SCH 1 and may detect the sequence index '37' through S-SCH 2. In this case, based upon the continuity of the indices, the receiving end may detect a sequence index of {34, 35} or a sequence index of {35, 36}.

The amount of information that should be included in the S-SCH may be freely modified depending upon a request from a telecommunications standard, such as LTE, and so on. For example, in the related art LTE standard, if '2' information sets are to be identified as antenna number information, 170*2=340 information sets should be included in the S-SCH. In addition, if '3' is required as the antenna number information, 170*3=510 information sets should be included in the S-SCH. Furthermore, if '4' is required as the antenna number information, 170*4=680 information sets should be included in the S-SCH.

In this case, when a Zadoff-Chu sequence being identified in accordance with 72 indices is used, and when 8 delay values are used, a total of 576 (=72*8) information sets may be represented. Furthermore, when 10 delay values are used, a total of 720 (=72*10) information sets may be represented.

Example 2 of Method 2

Example 2 of Method 2 uses a scrambling code and a modulation method based upon a phase rotation on the above-described constellation map. For example, when a Zadoff-Chu sequence being identified in accordance with 72 indices is used, and when two(2) information sets are represented by using the modulation method based upon the phase rotation on the constellation map, a total of 144(=72*2) information sets may be represented. Furthermore, when four(4) information sets are represented by using the modulation method based upon the phase rotation on the constellation map, a total of 288(=72*4) information sets may be represented.

When two(2) information sets (1 bit) or four(4) information sets (2 bits) are used, two(2) different information sets may be indicated based upon the case when the phase is rotated and when the phase is not rotated. In this case, Example 2 of Method 2 is advantageous in that the receiving end may be capable of performing coherent detection.

Coherent detection refers to a detection method first compensating elements distorted by a channel based upon a phase corresponding to a reference signal or a separate standard signal, and then performing a comparison process by using only a real number element or an imaginary number element from a metric with respect to a received signal. Unlike a non-coherent detection process, wherein the real number elements and imaginary number elements of a complex signal should all be used, since the amount of noise is reduced to a half when the detection process is performed, a gain of 3 dB may occur.

In this embodiment of the present invention, after performing channel compensation wherein 1 bit is added, the detection process may be performed when a comparison between real number values is performed. And, when 2 bits are added, the detection process may be performed when a comparison between real number values and imaginary number values is performed.

Example 3 of Method 2

Example 3 of Method 2 corresponds to an example using the scrambling code and the above-described Walsh code. For example, when a Zadoff-Chu sequence being identified in accordance with 72 indices is used, and when a Walsh code having the length of 8 is used to indicate 8 different information sets, a total of 576(=72*8) information sets may be represented.

Example 4 of Method 2

Example 4 of Method 2 corresponds to an example of using the M-sequence as a sequence being applied to the S-SCH, and transmitting information through a modulation process by using the phase rotation on the M-sequence. For example, the M-sequence may be used to represent P number of information sets, and N number of information sets may be represented through the modulation process by using the phase rotation on the M-sequence. However, when the sequences applied to the S-SCH are all limited to M-sequences, the first sequence and the second sequence are no longer distinguished (or identified) from one another, thereby the identification of Method 1 and Method 2 may become ambiguous.

Herein, the number of information sets that may be represented through the S-SCH by using Examples 1, 2, 3, and 4 of Method 2. Also, by configuring the S-SCH according to the embodiment of the present invention, the S-SCH may satisfy the standard required by a telecommunications standard, such as LTE and so on.
Method 3

Method 3 relates to configuring sequences for S-SCH 1 and S-SCH 2 by using the same sequence, yet having S-SCH 1 and S-SCH 2 modulated by different values.

Example 1 of Method 3

Figure 7:
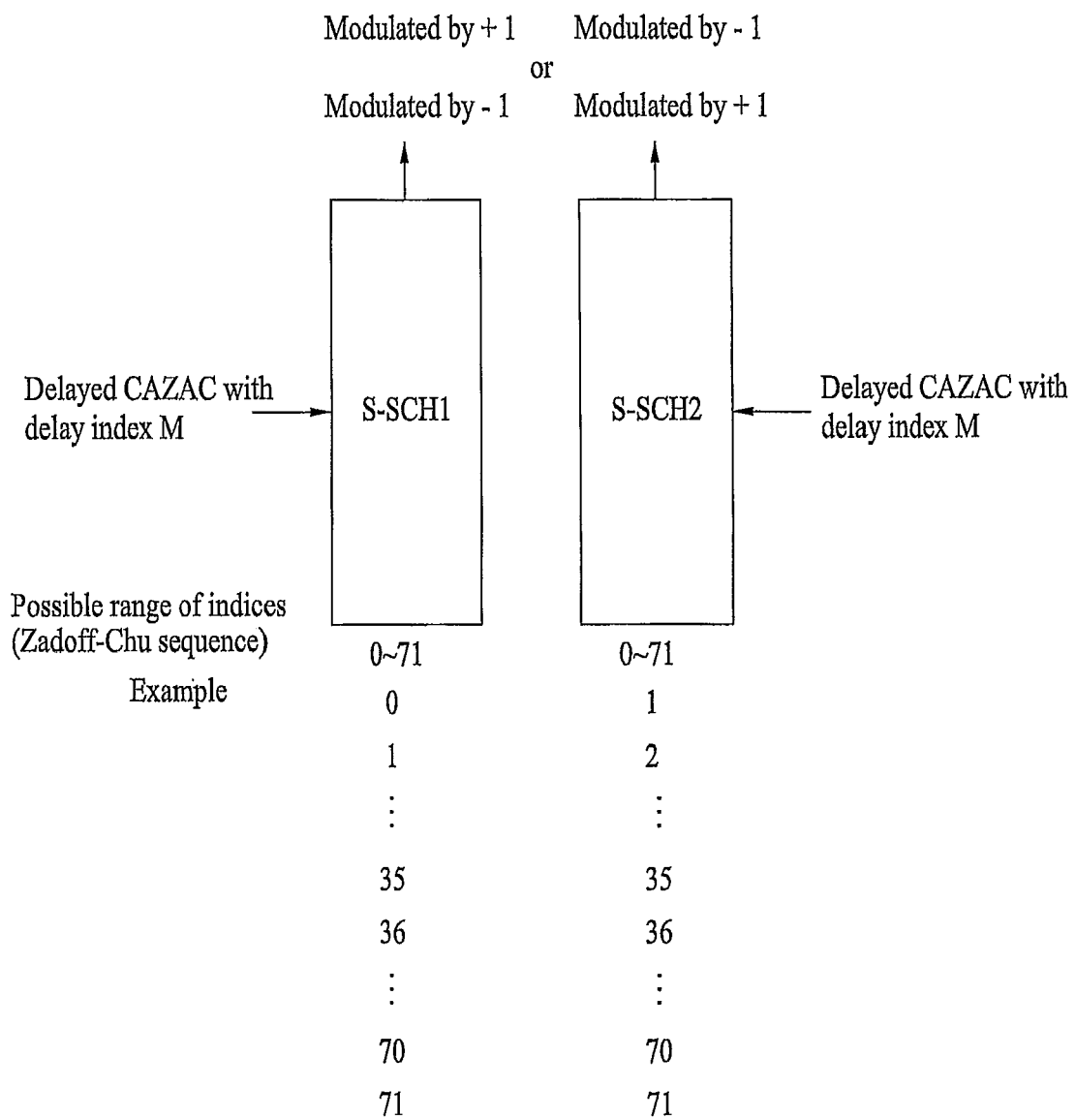
FIG. 7 illustrates a method of configuring S-SCH 1 and S-SCH2 according to Method 3.

FIG. 7 illustrates a method of configuring S-SCH 1 and S-SCH 2 according to Method 3. As shown in FIG. 7, a scrambling code (e.g., a Zadoff-Chu sequence) created based upon 72 indices is used, and orthogonal codes (e.g., delayed CAZAC sequences or Walsh codes) are used. In this case, the indices (indices for identifying scrambling codes) being allocated to each of S-SCH 1 and S-SCH 2 are the same. However, S-SCH 1 is modulated by '+1', and S-SCH is modulated by '−1'. More specifically, S-SCH 1 is configured by using a result of multiplying a sequence created by combining a scrambling code and an orthogonal code by '+1'. And, S-SCH 2 is configured by using a result of multiplying a sequence created by combining a scrambling code and an orthogonal code by '−1'.

Alternatively, S-SCH 1 may also be modulated by '−1', and S-SCH 2 may be modulated by In case of Method 3, identical sequences (sequences created by combining a scrambling code and an orthogonal code) are allocated to S-SCH 1 and S-SCH 2, then S-SCH 1 and S-SCH 2 are modulated by or '−1'. Therefore, the receiving end may normally recover data by using any one of S-SCH 1 and S-SCH 2. In the embodiment of the present invention, cell group IDs, information on antenna settings, and information on frame sync are provided through the S-SCH. Therefore, the information included in S-SCH may be obtained through one of S-SCH 1 and S-SCH 2.

As shown in FIG. 7, S-SCH 1 and S-SCH 2 are created by using scrambling codes (e.g., Zadoff-Chu sequence) having the same index and also created by delayed CAZAC sequences having the same delay value or by the same Walsh codes. For example, when CAZAC sequences using 8 different types of delay values are used, or when 8 different Walsh codes are used, the amount of information included in S-SCH or S-SCH 2 is equal to 576(=72*8). Furthermore, a modulation by and '−1' may be respectively applied to S-SCH 1 and S-SCH 2 so that information for frame sync may be provided.

Example 2 of Method 3

Example 2 of Method 3 uses a scrambling code (e.g., a Zadoff-Chu sequence) created based upon 72 indices and also uses a modulation method based upon a phase rotation on the constellation map. In this case, identical indices (indices for identifying the scrambling code) are allocated to S-SCH 1 and S-SCH 2. However, S-SCH 1 is modulated by '+1', and S-SCH 2 is modulated by '=1'. Alternatively, S-SCH 1 may be modulated by '−1', and S-SCH 2 may be modulated by '+1'.

In case of Example 2 of Method 3, the receiving end may also normally recover data by using at least any one of S-SCH 1 and S-SCH 2. Herein, S-SCH 1 and S-SCH 2 are created by using a scrambling code (e.g., a Zadoff-Chu sequence) created based upon 72 indices, and also created by using a modulation method based upon a phase rotation on the constellation map. For example, when using 4 different types of phase rotation, the amount of information included in S-SCH 1 or S-SCH 2 is equal to 298(=72*4). Furthermore, a modulation performed by each of '+1' and '−1' is respectively applied to S-SCH 1 and S-SCH 2, so that information on frame sync may be provided.

Example 3 of Method 3

Example 3 of Method 3 uses an M-sequence identified by 72 indices and also uses a modulation method based upon a phase rotation on the constellation map. In this case, identical indices are allocated to S-SCH 1 and S-SCH 2. However, S-SCH 1 is modulated by '+1', and S-SCH 2 is modulated by '−1'. In case of Example 3 of Method 3, the receiving end may also normally recover data by using at least any one of S-SCH 1 and S-SCH 2.
Method 4

Method 4 proposes a method of using the above-described delayed CAZAC sequence and a modulation method based upon a phase rotation on the constellation map at the same time. When using the delayed CAZAC sequence, a wide range of information sets may be represented in accordance with different delay values. Furthermore, when using the wide range of information sets may be represented by using a method of rotating the phase of related art symbols (e.g., QPSK, 16 QAM, etc.). Herein, by using the above-described delayed CAZAC sequence and the modulation method based upon a phase rotation on the constellation map, a wider range of information sets may be represented.

Method 4 may use the example shown in FIG. 5. More specifically, as shown in FIG. 5, a Zadoff-Chu sequence having an index ranging from a $0^{th}$ index to a $35^{th}$ index is allocated to S-SCH 1. And, a Zadoff-Chu sequence having an index ranging from a $36^{th}$ index to a $71^{st}$ index is allocated to S-SCH 2. In this case, by applying a circular delay in the time domain, and by using the modulation method based upon a phase rotation on the constellation map, a desired number of information sets may be verified. The receiving end may recover S-SCH 1 and S-SCH 2, so as to be able to verify information included in S-SCH.

Method 5

Method 5 proposes a method of performing modulation by using '+1' or '−1' in the above-described methods. More specifically, Method 5 proposes examples wherein modulation is performed on the S-SCH 1 generated according to the above-described Methods 1, 2, and 4 by using '+1 (or −1)' and on the S-SCH 2 by using '−1 (or +1)'. As described above, the modulated result using '+1' or may be used as information for frame synchronization.

Figure 8:
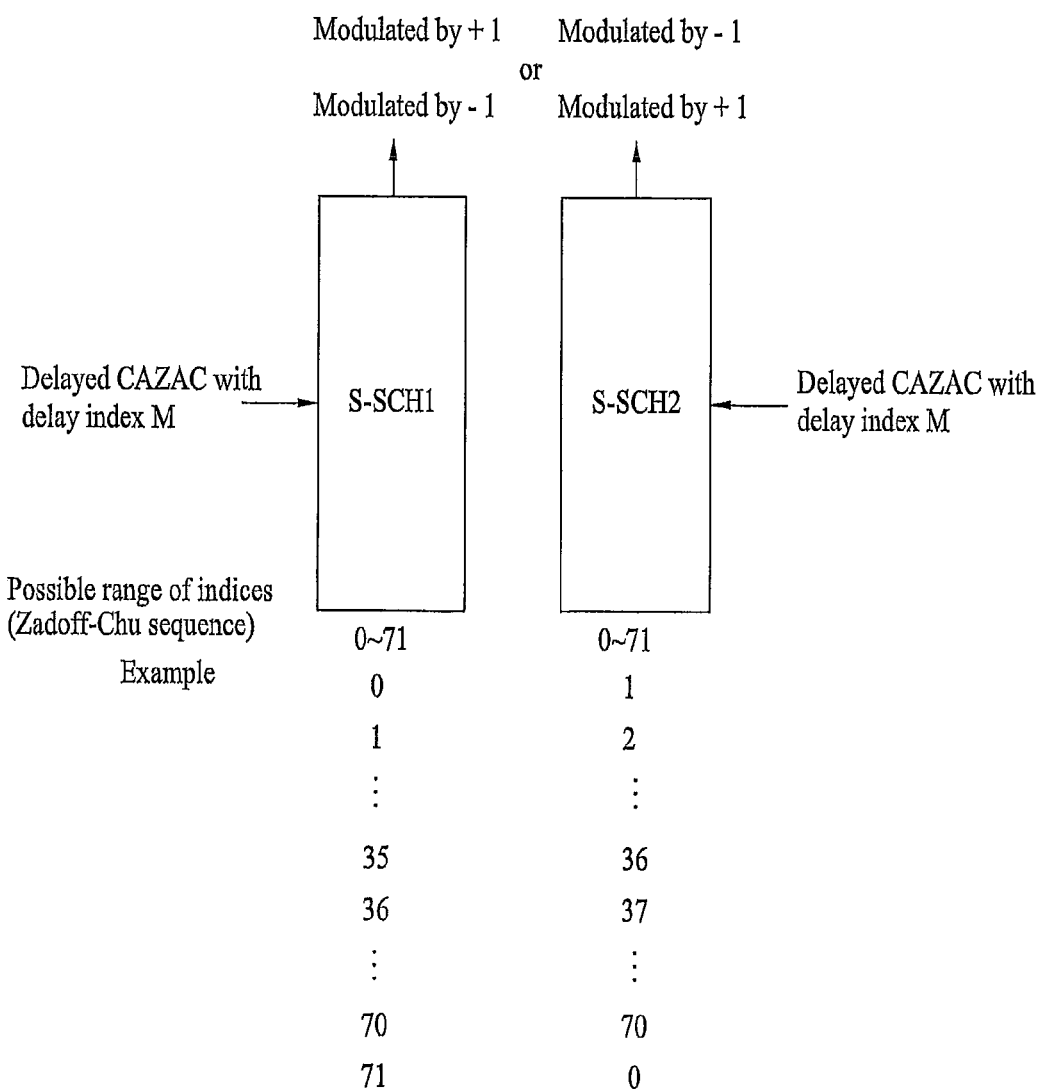
FIG. 8 illustrates a method of performing modulation by using '+1' or '−1' on the results of Method 2.

FIG. 8 illustrates a method of performing modulation by using '+1', or '−1' on the results of Method 2. As shown in FIG. 8, indices having a constant pattern are allocated to S-SCH 1 and S-SCH 2. More specifically, consecutive indices are allocated. However, the lower (or greater) index is allocated to S-SCH 1, and the greater (or lower) index is allocated to S-SCH 2. Furthermore, each of S-SCH 1 and S-SCH 2 is respectively modulated by '+1' or '−1'.

Figure 9:
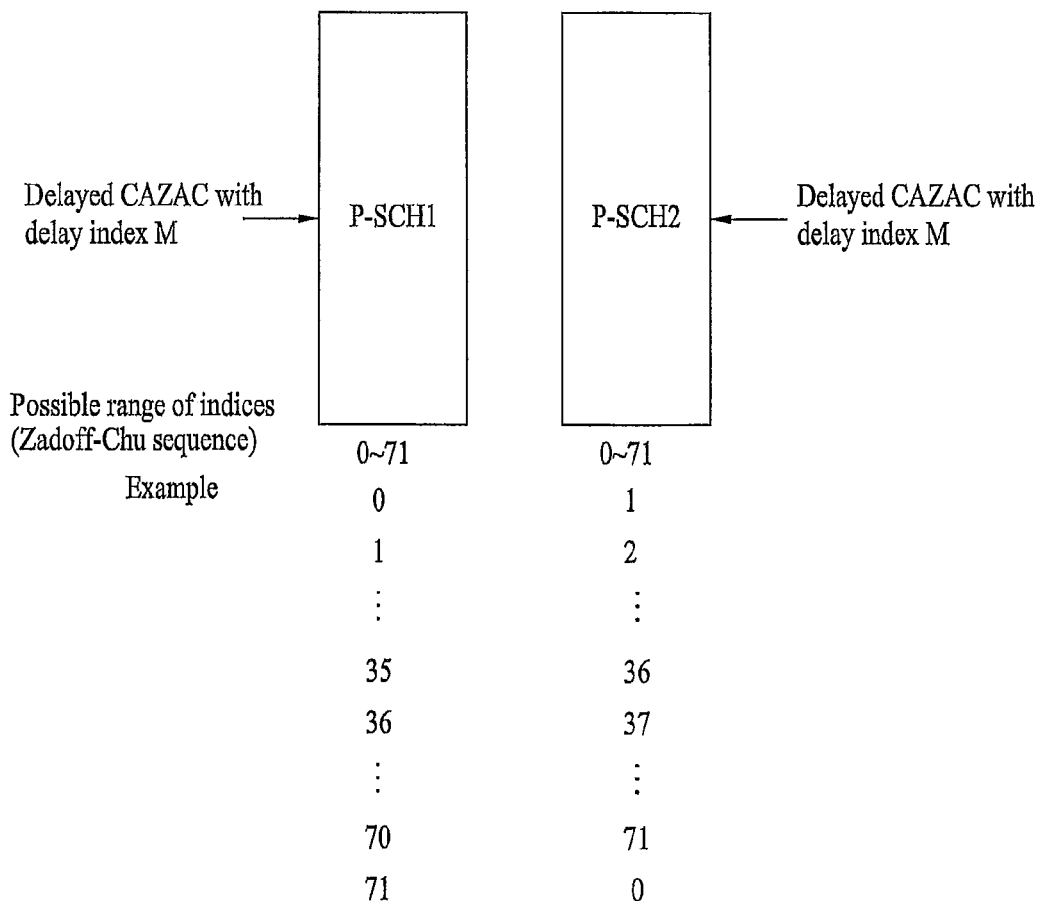
FIG. 9 illustrates an example of P-SCH being applied to Method 2.

The 5 methods described above may also be applied to channels other than the S-SCH. More specifically, these methods may also be applied to the P-SCH. FIG. 9 illustrates an example of P-SCH being applied to Method 2. As shown in FIG. 9, the above-described Method 2 may be applied without modification. However, Method 2 is applied to the P-SCH, thereby transmitting the desired information. Furthermore, FIG. 10 illustrates an example of P-SCH being applied to Method 3.

Figure 10:
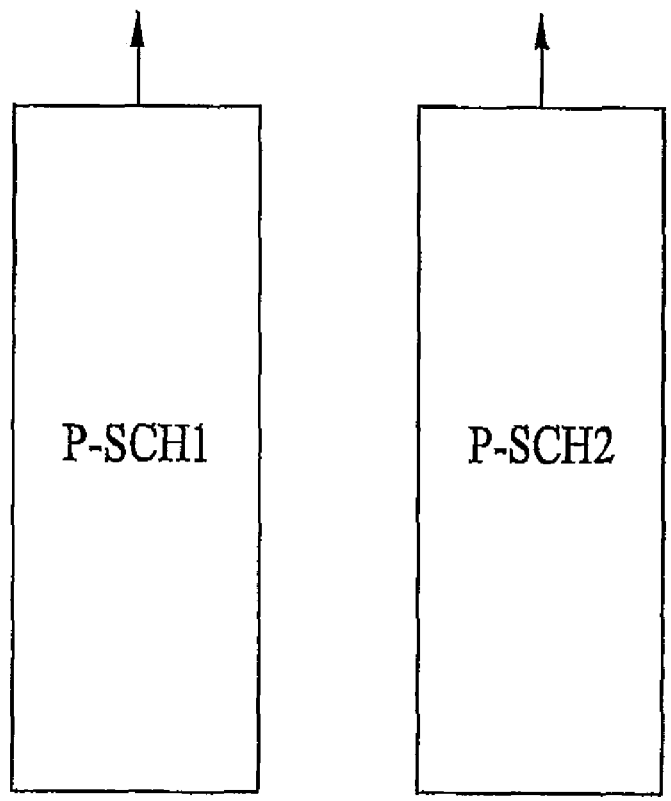
FIG. 10 illustrates an example of P-SCH being applied to Method 3.

As shown in FIG. 10, Method 1 to Method 5 may be applied to channels such as the P-SCH. At this point, P-SCH 1 and P-SCH 2 of FIG. 9 and FIG. 10 may represent two(2) P-SCR's that are included in a single radio frame, just as the above-described S-SCH 1 and S-SCH 2. Alternatively, P-SCH 1 and P-SCH 2 of FIG. 9 and FIG. 10 may also respectively represent P-SCH units applying logically identifying a particular P-SCH and applying different sequences.

Second Embodiment

Hereinafter, the second embodiment of the present invention proposes a method for transmitting control information on a hopping option with respect to a downlink reference signal. Preferably, the second embodiment of the present invention may be combined with Method 1 to Method 5 according to the first embodiment of the present invention. More specifically, the control information on the hopping option may be added by using the P-SCH or S-SCH configured according to the first embodiment of the present invention. Hereinafter, the hopping option will be described in detail.

The hopping option relates to a frequency hopping of a downlink reference signal. A transmitting end may perform a hopping of the reference signal in accordance with a frequency band managed by the transmitting end itself, service types (e.g., a MBMS service or a uni-cast service), and a cell. For example, the transmitting end may perform a hopping of the reference signal in a first cell by using a first pattern, perform a hopping of the reference signal in a second cell by using a second pattern and perform a hopping of the reference signal in a third cell by using a third pattern.

It is preferable that all sub-frames within a corresponding cell or carrier perform or do not perform a hopping process with respect to a downlink reference signal. In this case, a hopping unit corresponds to a sub-frame. In this case, it is preferable that the receiving end receives information on whether or not the frequency hopping has been performed on the reference signal from the transmitting end. The information on whether or not the frequency hopping has been performed on the reference signal corresponds to the hopping option.

The reference signal corresponds to a signal pre-known by the transmitting end as a signal referred to as a pilot signal. Processes such as channel estimation may be performed by using the reference signal. Hereinafter, a signaling process for the hopping process will be described in detail. Since the downlink reference signal provides a phase reference required for demodulating a control channel or a data channel (or traffic channel), the receiving end should be informed (or aware) of whether or not hopping has been performed. If the receiving end is not informed of whether or not the hopping process has been performed, a blind detection process is required, thereby increasing the complexity of the present invention.

The second embodiment of the present invention proposes a signaling process for the hopping option. The second embodiment also proposes a method wherein the hopping option is detected during a process step in which the receiving end (e.g., a terminal (UE)) is not required to use the reference signal as the phase reference. More specifically, the second embodiment proposes a method wherein the hopping option is detected during a cell search step. A current cell search step will now be described in detail.

First of all, timing acquisition is performed by using the P-SCH, a frequency offset is estimated and compensated, and a cell ID is detected from a cell group ID. Secondly, a cell group ID is detected by using the S-SCH and frame boundary acquisition is performed, thereby receiving various types of information. Thirdly, either cell ID confirmation is performed by using the reference signal or various types of information are verified. Fourthly, a primary broadcast channel (p-BCH) is demodulated, so as to acquire basic (or essential) system parameters.

Four(4) different methods of detecting the hopping option in the above-described cell search step may be performed as described below. Firstly, a method of transmitting the hopping option by using the p-BCH may be used. However, this method may cause the following problems. Basically, since the p-BCH is modulated by basic modulation units, such as QPSK, a reference signal for coherent demodulation is required. Therefore, the problem that may occur when using this method corresponds to a condition that a hopping process must not be performed on the reference signal for the p-BCH.

Secondly, a method of transmitting the hopping option by using the reference signal may be used. However, this method may cause a problem of deteriorating the performance of the present invention. The reference signal is inserted at intervals of three(3) subcarrier waves in the frequency domain. Therefore, the reference signal is allocated to a region outside of a coherent BW section. Since the receiving end cannot be informed of a transmission band of a current receiving end unless the p-BCH is decoded, only a band of 1.25 Mhz shall be used. In this case, only a reference signal included in a sub-frame may be used. (Herein, the length of the reference signal is equal to 48.) Therefore, the performance of the present invention may be deteriorated as compared to when using the methods that will be described as follows.

Thirdly, a method of transmitting the hopping option by using the P-SCH may be used. The basic assumption of the present LTE system is that three(3) Primary Synchronization Codes (PSCs) are used. In order to use these 3 PSCs, a cell planning should be performed. The cell planning refers to a process of allocating a PSC to a cell or sector so that a telecommunications system may be operated efficiently.

When supplying a plurality of PSCs through the P-SCH, a problem of increasing complexity at the receiving and may occur. In case of a correlation calculation performed for the demodulation of the P-SCH, unlike in the correlation calculation with respect to the S-SCH, when a wide range of information are included in the P-SCH, the degree of complexity may be increased at a vast rate. In case of using 3 different types of PSCs, when the hopping option is added to the P-SCH, the level of complexity may increase even more. Therefore, it is preferable that information such as the hopping option is not included in the P-SCH. Meanwhile, a method for rotating a constellation map of the P-SCH, in other words, an M-PSK modulation method may be used for adding a hopping option to the P-SCH.

Finally, a method of transmitting the hopping option by using the S-SCH may be used. As described in the first embodiment of the present invention, a sequence index may be added to the S-SCH, or information may be added to the S-SCH by using other FDM/TDM (when the S-SCH consists of 2 or more symbols)/CDM. More specifically, information may be added by using a wide range of index sequences. Furthermore, information may also be added by using index sequences identified by different frequency/time/code. Meanwhile, as described in the first embodiment, a 1-bit hopping option may be added herein by using a M-PSK modulation process.

In the related art S-SCH detection method, a blind detection process should be performed on a short circular prefix (CP)/long circular prefix (CP). More specifically, a FFT calculation should be performed twice. However, when performing the M-PSK modulation process according to the present invention, 1-bit (i.e., a hopping option) may be acquired without any increase in complexity. In other words, when the M-PSK modulation process is applied, a 1-bit unit information may be transmitted without any increase in complexity or deterioration of performance.

As described above, it is preferable that the hopping option is transmitted by using a S-SCH or P-SCH proposed in the first embodiment of the present invention. Hereinafter, the method for transmitting the hopping option by using the S-SCH will now be described. Most particularly, the method of transmitting the hopping option by using Method 3 of the first embodiment will now be described.

As shown in FIG. 7, Method 3 of the first embodiment performs a multiplication process by '+1' or '−1' so as to transmit the 1-bit unit additional information. Herein, the process of multiplying '+1' or '−1' is identical to performing a phase rotation on a constellation map. Therefore, Method 3 of the first embodiment may correspond to the method of performing the above-described M-PSK modulation process. In the example shown in FIG. 7, frame synchronization may be acquired by using the M-PSK modulation process.

Hereinafter, the second embodiment of the present invention proposes that only the hopping option is to be transmitted by using the M-PSK modulation process applied to the S-SCH, or that information for frame synchronization is to be transmitted, or that information for both hopping option and frame synchronization are to be transmitted. Hereinafter, the example of transmitting information for both hopping option and frame synchronization will now be described. It is assumed that each of the information for the hopping option and the information for the frame synchronization corresponds to a 1-bit unit information (i.e., a 2-bit unit information when added together). Herein, the information for the hopping information or frame synchronization may correspond to a bit unit having a predetermined size.

Figure 11:
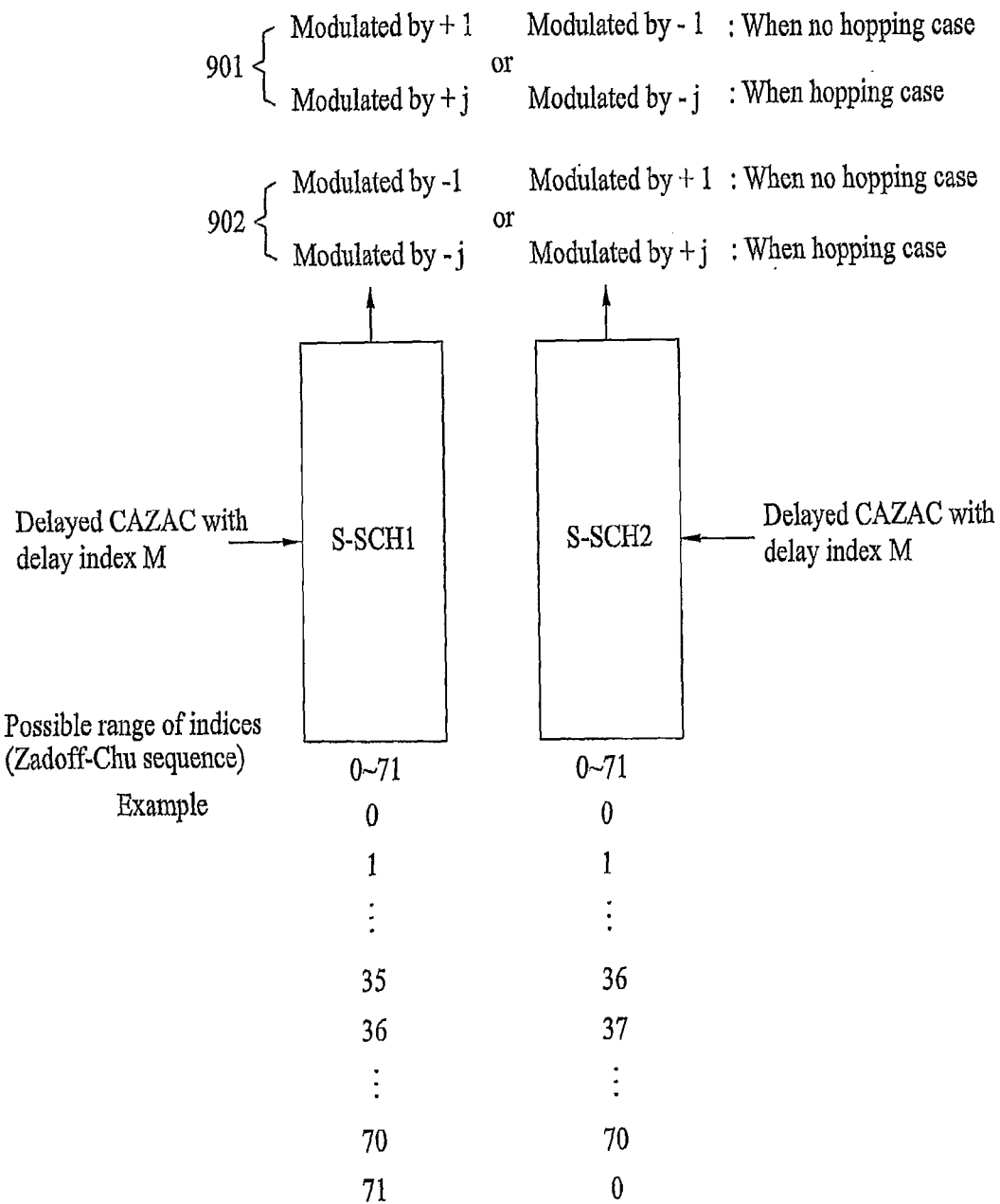
FIG. 11 illustrates a block view showing an example including all information corresponding to a hopping option and frame synchronization according to a second embodiment.

FIG. 11 illustrates a block view showing an example including all information corresponding to a hopping option and frame synchronization according to a second embodiment. Referring to FIG. 11, sequence indices are added to S-SCH 1 and S-SCH 2, which is similar to the example shown in FIG. 7. Herein, the sequence index may correspond to a sequence index identifying a Zadoff-Chu sequence. However, the present invention will not be limited to the example presented according to the second embodiment. Therefore, as described above, the sequence index may also correspond to a Hamadard sequence, an M-sequence, and so on. Furthermore, additional information may be transmitted by applying a delayed CAZAC sequence method to S-SCH 1 and S-SCH 2.

Unlike in the example shown in FIG. 7, in the example shown in FIG. 11, since the information on the hopping option is also added, it is preferable that 2 types of information are represented by using the M-PSK modulation process. For example, as shown in the first case 901 of FIG. 11, when the hopping is deactivated, the M-PSK modulation may be performed by using '+1' and '−1'. Alternatively, when the hopping is activated, the M-PSK modulation may be performed by using '+j' and '−j'. As another method of the present invention, as shown in the second case 902 of FIG. 11, when the hopping is deactivated, the M-PSK modulation may be performed by using '−1' and '+1'. Alternatively, when the hopping is activated, the M-PSK modulation may be performed by using '−j' and '+j'.

Each of S-SCH 1 and S-SCH 2 according to the second embodiment of the present invention provides information on a frame boundary, i.e., information for frame synchronization. Additionally, each of S-SCH 1 and S-SCH 2 also provides information on the hopping option indicating a hopping pattern. The example shown in FIG. 11 described a method for transmitting information on the hopping option and/or the frame synchronization by using the S-SCH. As described above, the second embodiment is based upon the first embodiment of the present invention. Therefore, information on the hopping option and/or the frame synchronization may also be transmitted by using the P-SCH, instead of the S-SCH. In this case, instead of using S-SCH 1 and S-SCH 2, as shown in the example of FIG. 11, information on the hopping option and/or the frame synchronization may also be transmitted by using P-SCH 1 and P-SCH 2.

Hereinafter, an example of various M-PSK methods will now be described. As shown in Equation 3, the M-PSK modulation may be represented by $C''_{modulation}(k)$. More specifically, depending upon a frequency element k, values identical to or different from one another may be used to rotate a phase element. For example, a S-SCH 1 sequence included in the radio frame is transmitted through a plurality of subcarriers. In this case, the phase element may be rotated by using a single value of either '+1' or '+j'. Alternatively, the phase element of only a particular subcarrier may be rotated, and the phase elements of the remaining subcarriers may not be rotated. Furthermore, only the phase element corresponding to a particular (or specific) sequence element may also be rotated.

The M-PSK modulation process described in the embodiment of the present invention may be used in a wide range of channels. And, as an example, a result of performing the M-PSK modulation process on the S-SCH will now be described. FIG. 12A to FIG. 12F respectively illustrate an example of rotating a phase element by using different phase elements with respect to a plurality of subcarriers.

It is preferable that the above-described CAZAC sequence and/or delayed CAZAC sequence are/is already applied to the S-SCH shown in the examples of FIG. 12A to FIG. 12F, and that the M-sequence is applied to the S-SCH shown in the examples of FIG. 12A to FIG. 12F, as described above. Furthermore, the S-SCH 1 and S-SCH 2 shown in the examples of FIG. 12A to FIG. 12F may each correspond to sequences chronologically adjacent to one another or distant from one another.

Figure 12A:
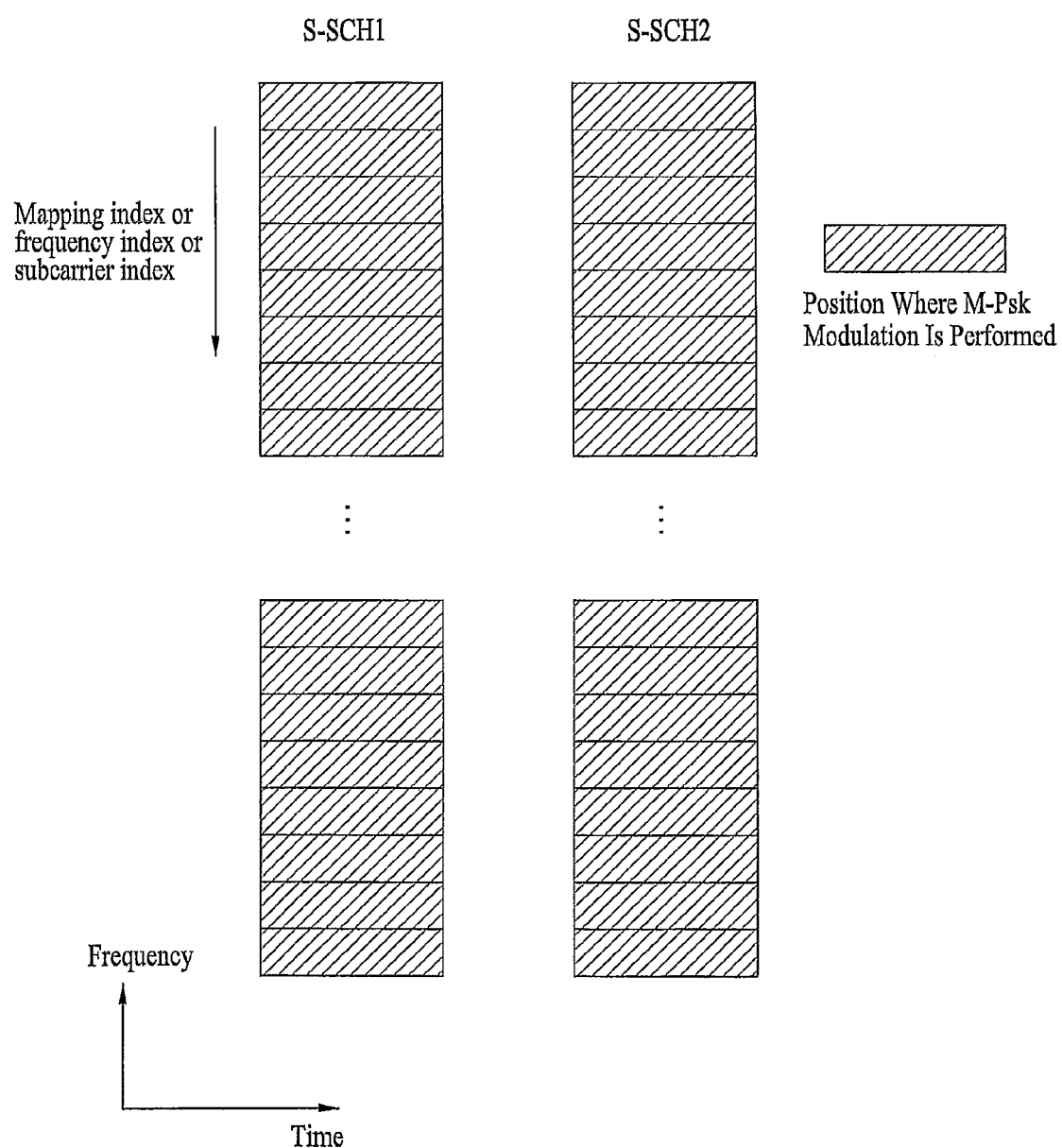
FIG. 12A to FIG. 12F respectively illustrate an example of rotating a phase element by using different phase elements with respect to a plurality of subcarriers.

FIG. 12A illustrates a result of performing M-PSK modulation by using a phase rotation element of one of S-SCH 1 and S-SCH 2. As shown in FIG. 12A, the phase may be rotated by using one value (e.g., '+1') or a plurality of values (e.g., applying '+1' on some elements and applying '−j' on the remaining elements) with respect to all frequency elements. Therefore, since the phases corresponding to all frequency elements are rotated, the example shown in FIG. 12A requires a separate phase reference (or standard).

For example, when S-SCH 1 and S-SCH 2 of FIG. 12A respectively correspond to 72 subcarriers, the S-SCH 1 may correspond to a sequence having the length of 72 (e.g., the above-described CAZAC sequence, Zadoff-Chu sequence, M-sequence, Frank sequence, etc.), which is generated by a seed value. The S-SCH 2 may correspond to a sequence having the length of 72, which is generated by another seed value.

Figure 12B:
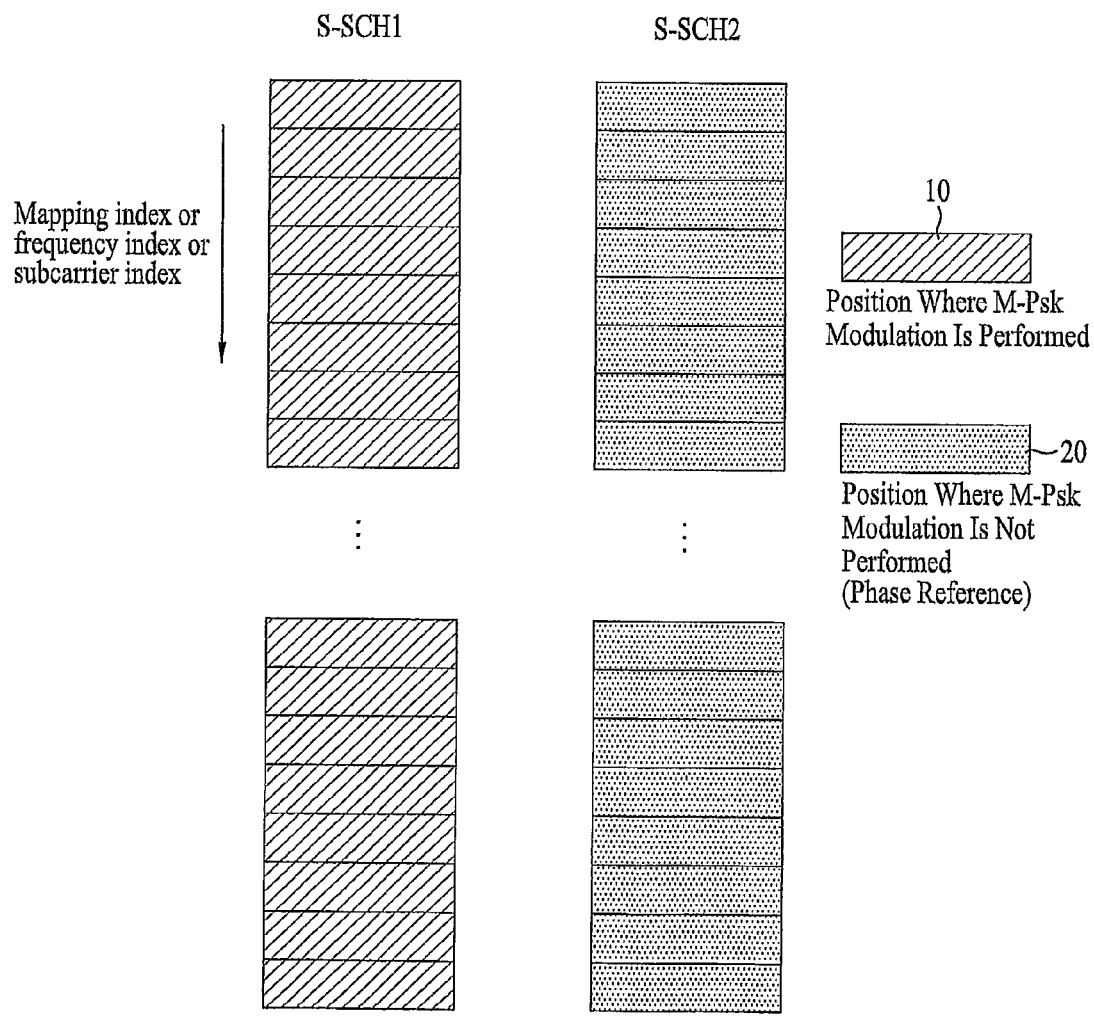

FIG. 12B illustrates a result of performing M-PSK modulation with respect to S-SCH 1, and a result of not performing M-PSK modulation with respect to S-SCH 2. Since M-PSK modulation is not performed on some of the sequence, the example shown in FIG. 12B is advantageous in that a separate phase reference is not required to be provided. Herein, region 10 of FIG. 12B may correspond to a sequence having the length of 72, which is generated by a specific first seed value. Alternatively, region 20 of FIG. 12B may correspond to a sequence having the length of 72, which is generated by a specific second seed value. Such characteristics may also be equally applied to the examples shown in FIG. 12C to FIG. 13D.

Figure 12C:
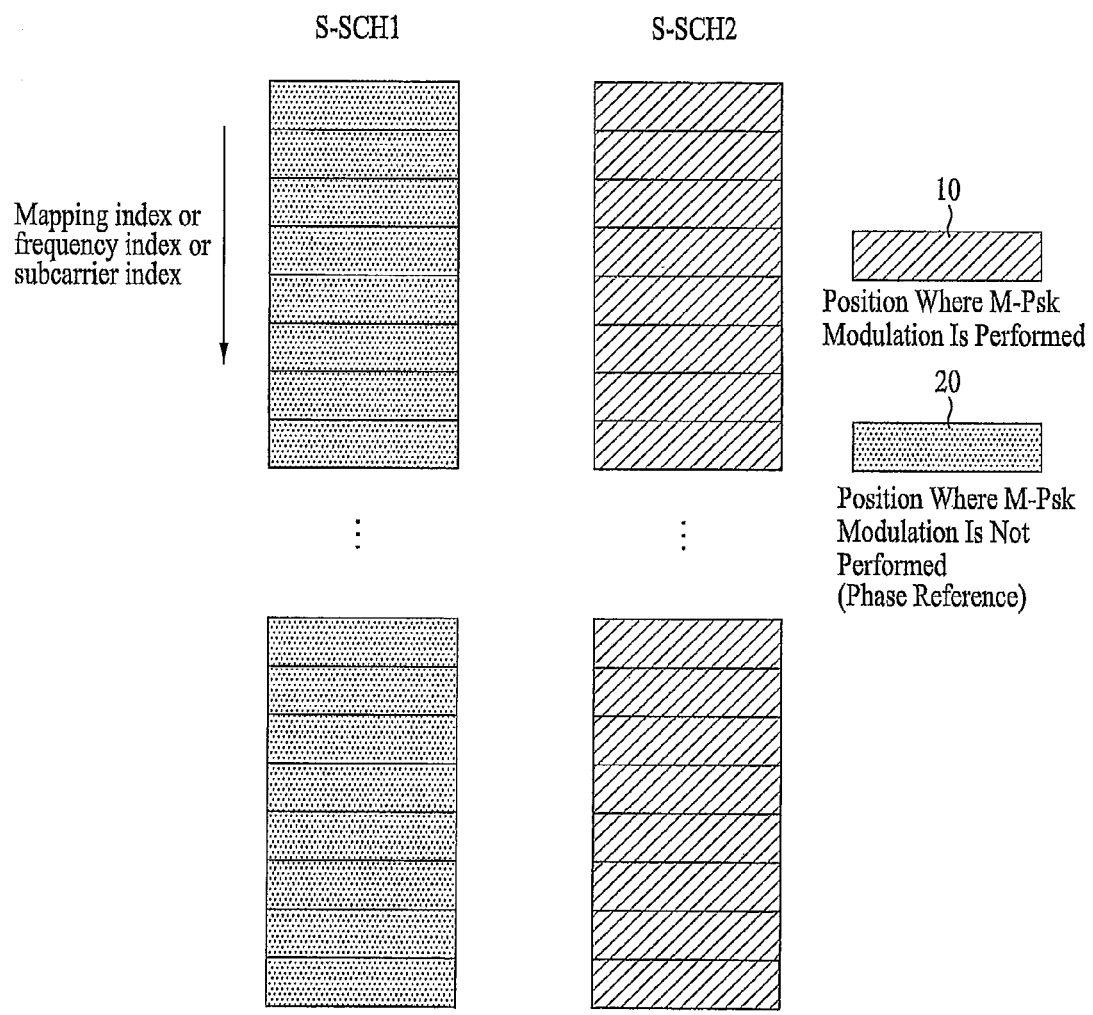
Figure 12D:
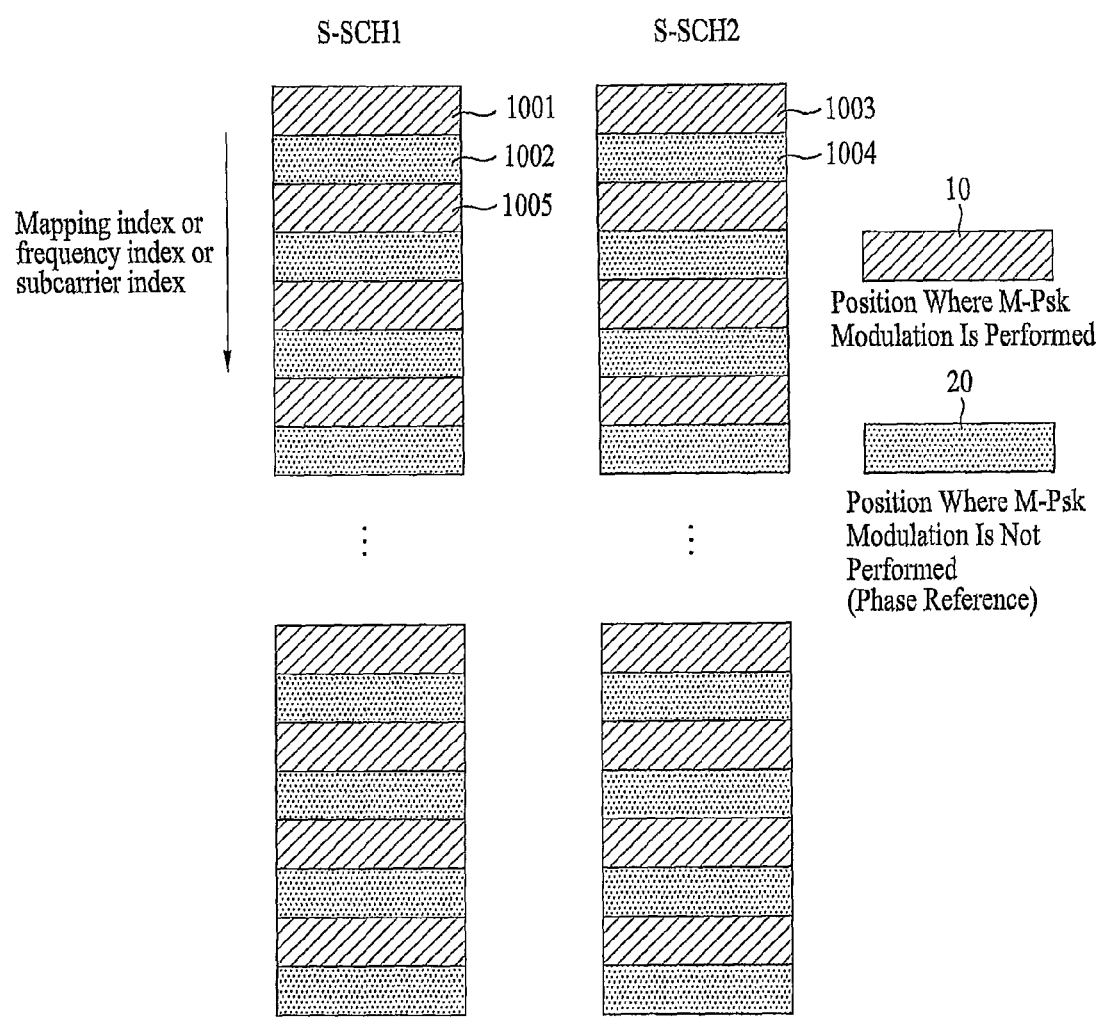

Furthermore, the M-PSK modulation may not be performed in region 10, and the M-PSK modulation may be performed in region 20. Such characteristics may also be equally applied to the examples shown in FIG. 12C to FIG. 13D. FIG. 12C illustrates an example wherein a sequence that is not processed with M-PSK modulation can be freely decided on a sequence that is processed with M-PSK modulation. FIG. 12D illustrates another example according to the embodiment of the present invention.

Referring to FIG. 12D, M-PSK modulation is performed on some frequency elements of S-SCH 1 and on some frequency elements of S-SCH 2, and M-PSK modulation is not performed on the remaining frequency elements. More specifically, M-PSK modulation is performed on elements 1001, 1003, 1005, and 1006. Conversely, M-PSK modulation is not performed on elements 1002 and 1004. In this case, each phase of the elements 1001, 1003, 1005, and 1006 may be rotated by using one phase rotation element (e.g., '+j') or by using a plurality of phase elements. In other words, each phase of elements 1001 and 1003 may be rotated by '−1', and each phase of elements 1005 and 1006 may be rotated by '+j'.

Figure 12E:
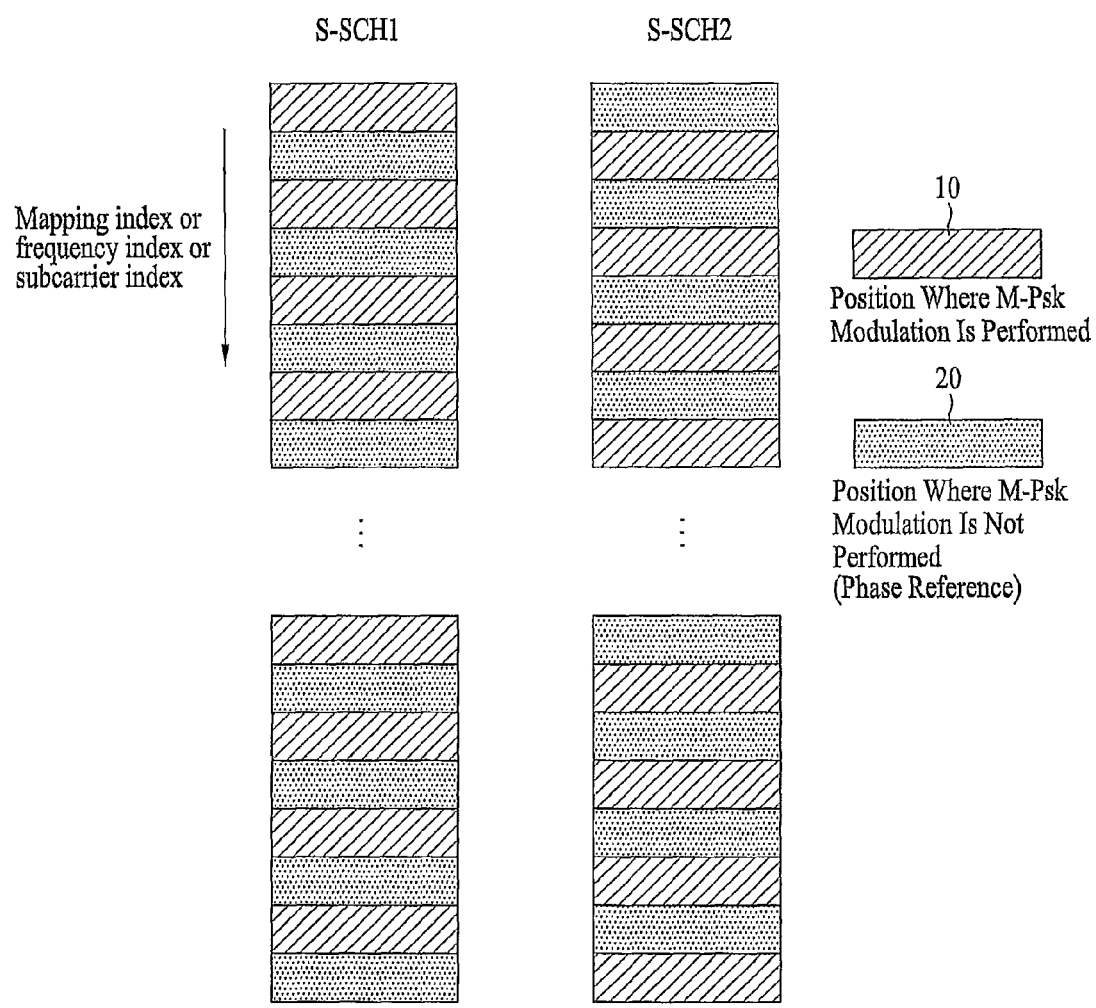
Figure 12F:
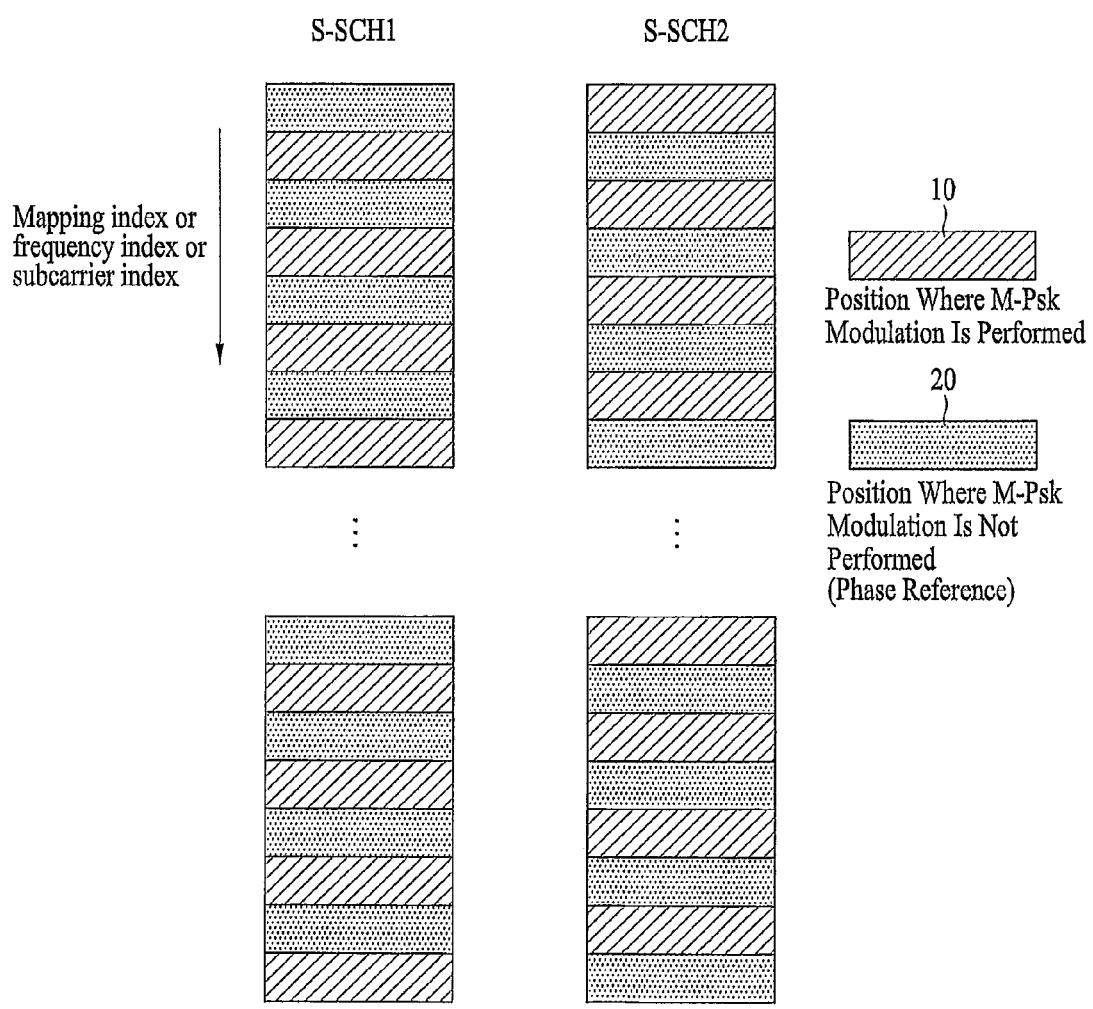

FIG. 12E to FIG. 12F illustrate another examples according to the embodiment of the present invention.

Figure 13A:
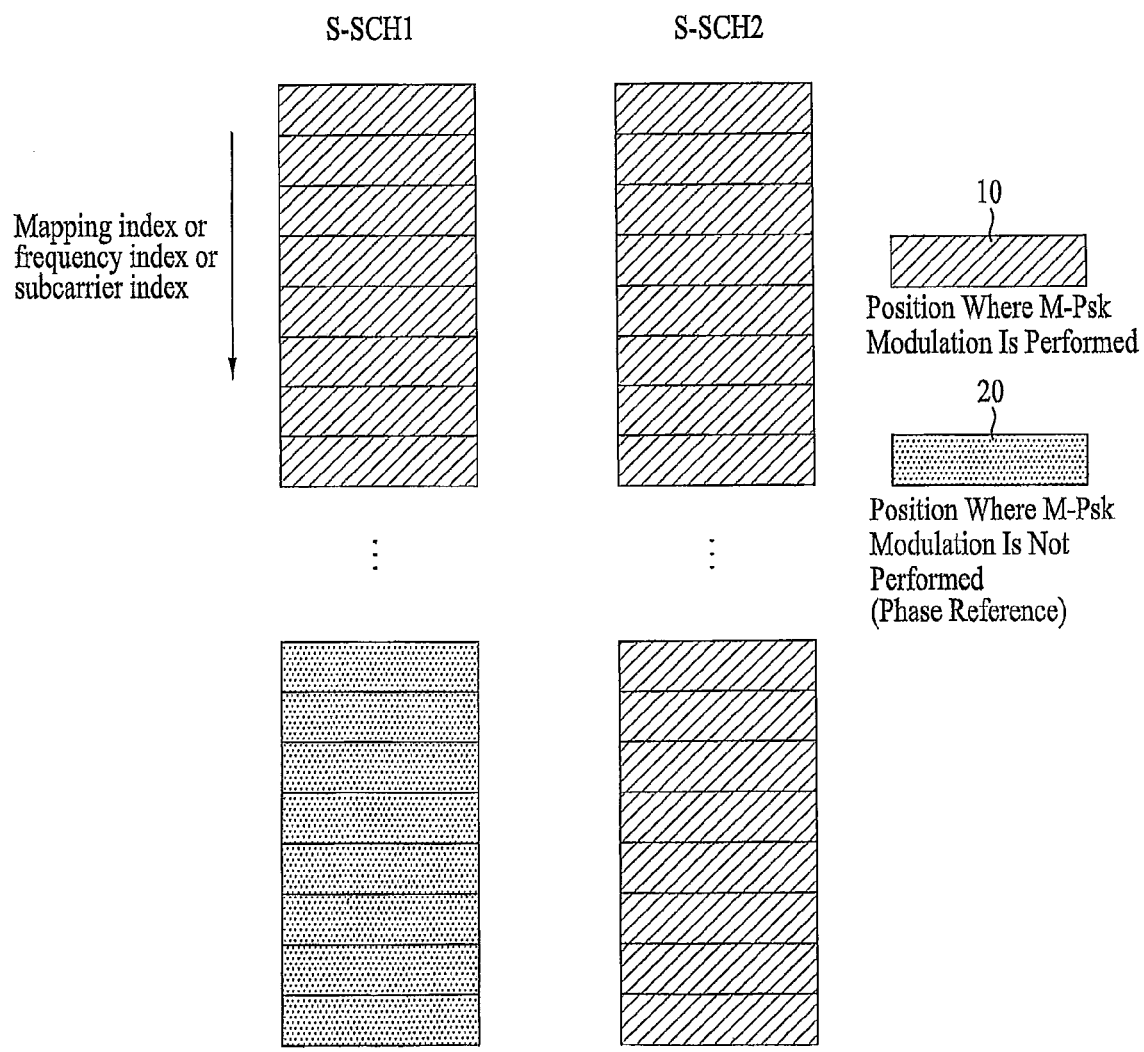
FIG. 13A to FIG. 13D illustrate another embodiment of the present invention.
Figure 13B:
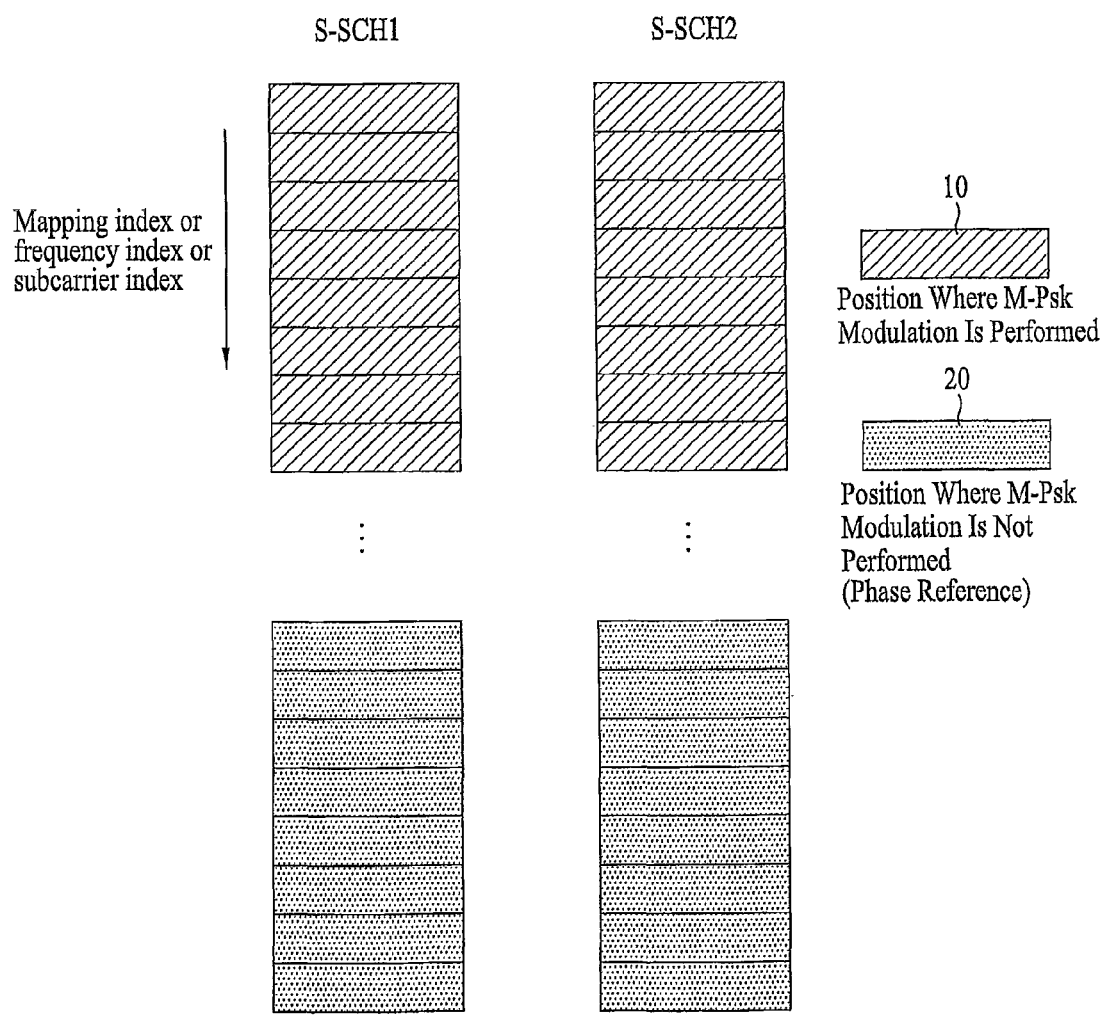
Figure 13C:
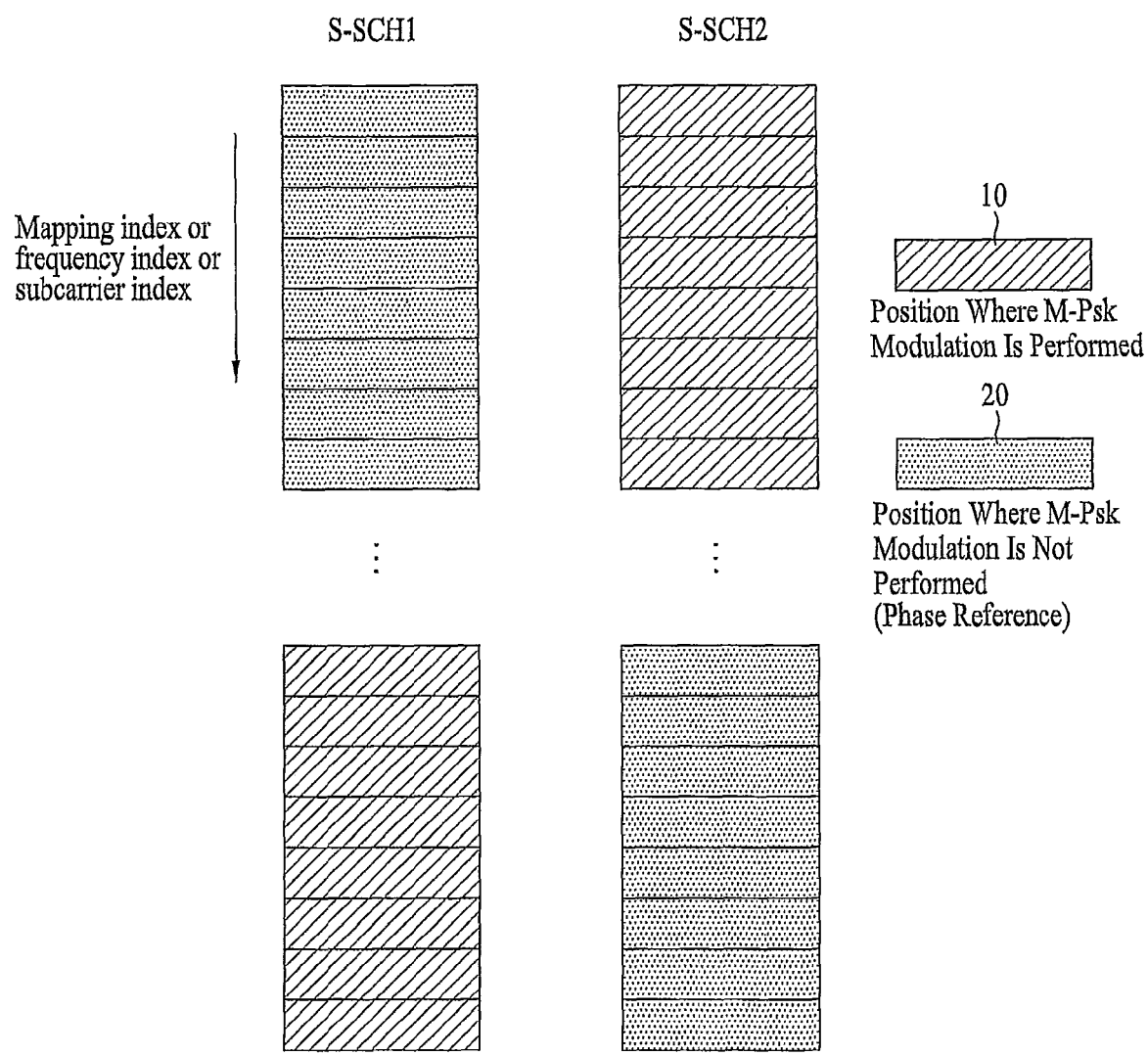

FIG. 13A to FIG. 13D illustrate other examples according to the embodiment of the present invention. As shown in FIG. 13A, the M-PSK modulation may be performed on all remaining elements of S-SCH 1 excluding some elements. Also, as shown in FIG. 13B, the M-PSK modulation may be performed on all remaining elements of S-SCH 1 and S-SCH 2 excluding some elements. Furthermore, the M-PSK modulation process may be performed as shown in the example of FIG. 13C. Meanwhile, according to the embodiment of the present invention, the value of $C''_{modulation}(k)$ may be freely controlled (or adjusted) so that a diversity of M-PSK modulation processes may be performed.

Figure 13D:
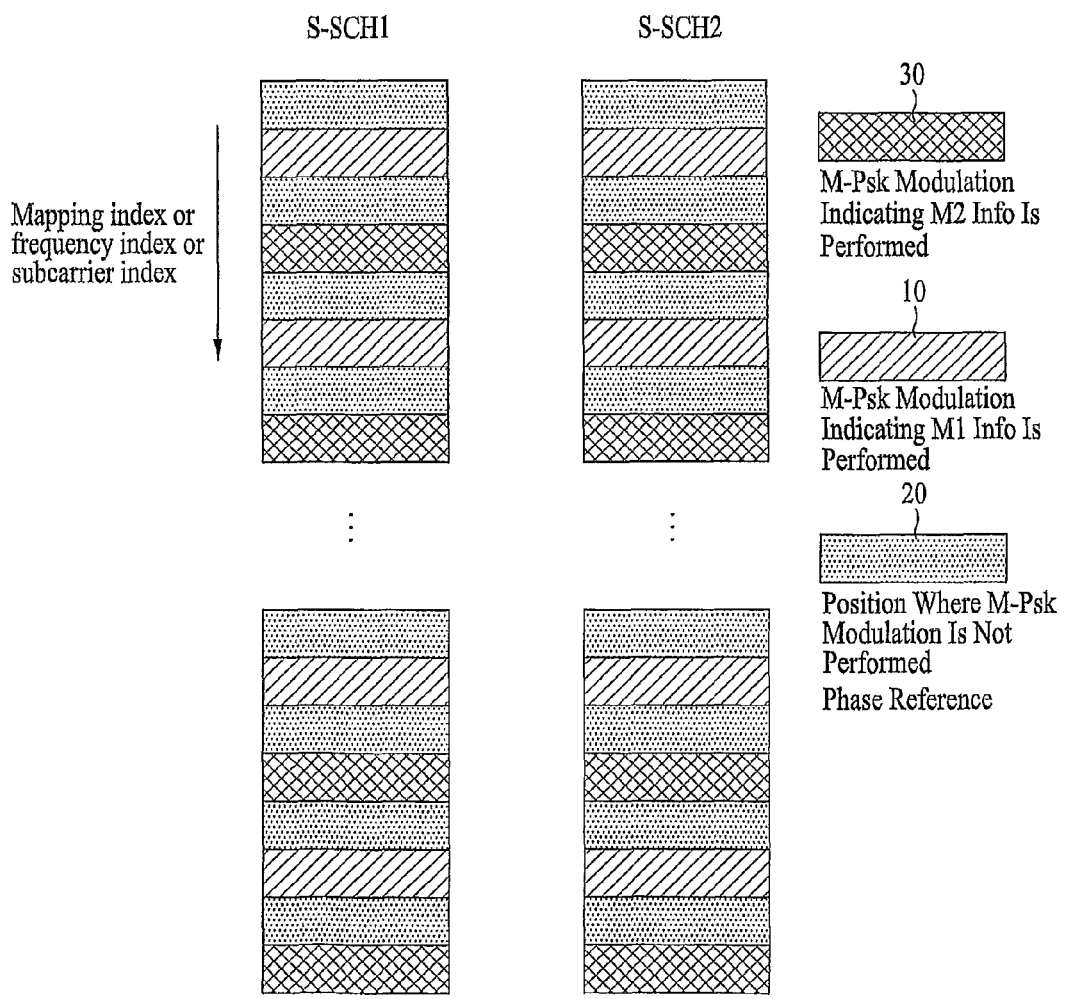

FIG. 13D illustrates an example of processing different types of information by using the M-PSK modulation. As shown in FIG. 13D, an M-PSK modulation indicating M1 info may be applied to some frequency elements 10. And, an M-PSK modulation indicating M2 info may be applied to other frequency elements 30. Further, the M-PSK modulation may not be applied to the remaining elements 20. The M1 info or M2 info may correspond to a variety of information including information for frame synchronization or hopping information.

In the above-described examples, a position where the M-PSK modulation has been performed and a position where the M-PSK modulation has not been performed may be changed (or switched). Additionally, the above-described examples may be set-up so that the receiving end can acquire corresponding information by using the differential correlation between each set of information of the regions having M-PSK modulation performed thereon without any separate phase references. Hereinafter, according to yet another embodiment of the present invention, an example of an S-SCH being applied to a 3GPP E-UTRA (LTE) system.

Third Embodiment

Figure 14:
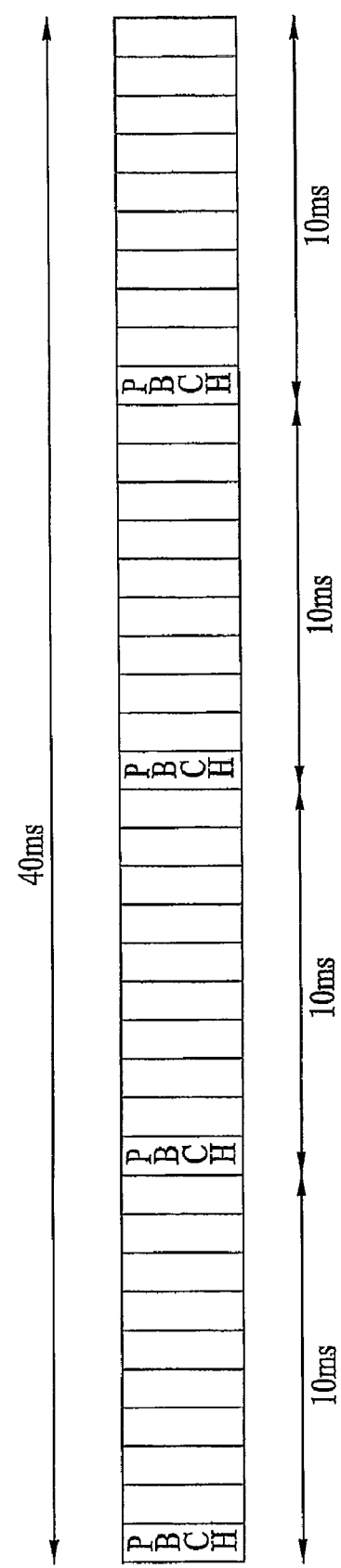
FIG. 14 illustrates an example of P-BCH being transmitted at a cycle period of 40 ms in a 3GPP LTE system.

In the LTE system, the P-BCH is transmitted 4 times during 40 ms. Herein, the P-BCH may be self-decodable by using any one of the 4 P-BCH's. FIG. 14 illustrates an example of P-BCH being transmitted during a period of 40 ms. However, a complexity may occur in the UE, wherein blind detection processes are performed on a total of 4 different cases for a 10 ms identification of the P-PCH detected by the US itself during a period of 40 ms.

A total of 340 information sets are transmitted to the S-SCH, wherein 170 cell group ID information sets and 2 10 ms frame boundary information are included. At this point, in detecting the S-SCH, a coherent detection may be performed by using a channel value estimated from the P-SCH. Alternatively, a non-coherent detection may be performed by using the S-SCH itself. The time section, from which the P-BCH is transmitted, may be transmitted from a subframe, from which a synchronization channel is transmitted.

Therefore, when the present invention is applied for a process of adding a 2-bit information set, which can identify a 10 ms P-BCH boundary, to a code that is applied to the S-SCH (hereinafter referred to as a "SCC"), flexibility may be provided in an implementation of the UE. In other words, when a UE that does not request a blind decoding process to be performed, detects the SSC, a coherent detecting process is performed, so that the 10 ms P-BCH boundary information can be acknowledged in advance. Accordingly, the P-BCH decoding process is not required to be performed as the blind decoding process.

The UE, which does not relate with the 4 blind decoding processes, does not detect the corresponding information from the SSC. Instead, after performing a coherent or non-coherent SSC detection process, the UE may perform blind decoding on the 4 P-BCH's. This provides flexibility for a UE manufacturer in facilitating the implementation of the terminal. An example of applying a BPSK modulation of the present invention will now be described. More specifically, when the SSC is represented as (1, 1), (1, −1), (−1, −1), (−1, 1) by using BPSK, the boundary information for each P-BCH may be indicated as follows.

0 ms: (1,1)
10 ms: (1,−1)
20 ms: (−1,−1)
30 ms: (−1,1)

Additionally, the following describes an example of applying a QPSK modulation. More specifically, when the SSC is represented as +1, +j, −1, −j by using QPSK, the boundary information for each P-BCH may be indicated as follows.

0 ms: +1
10 ms: +j
20 ms: −1
30 ms: −j

Figure 15:
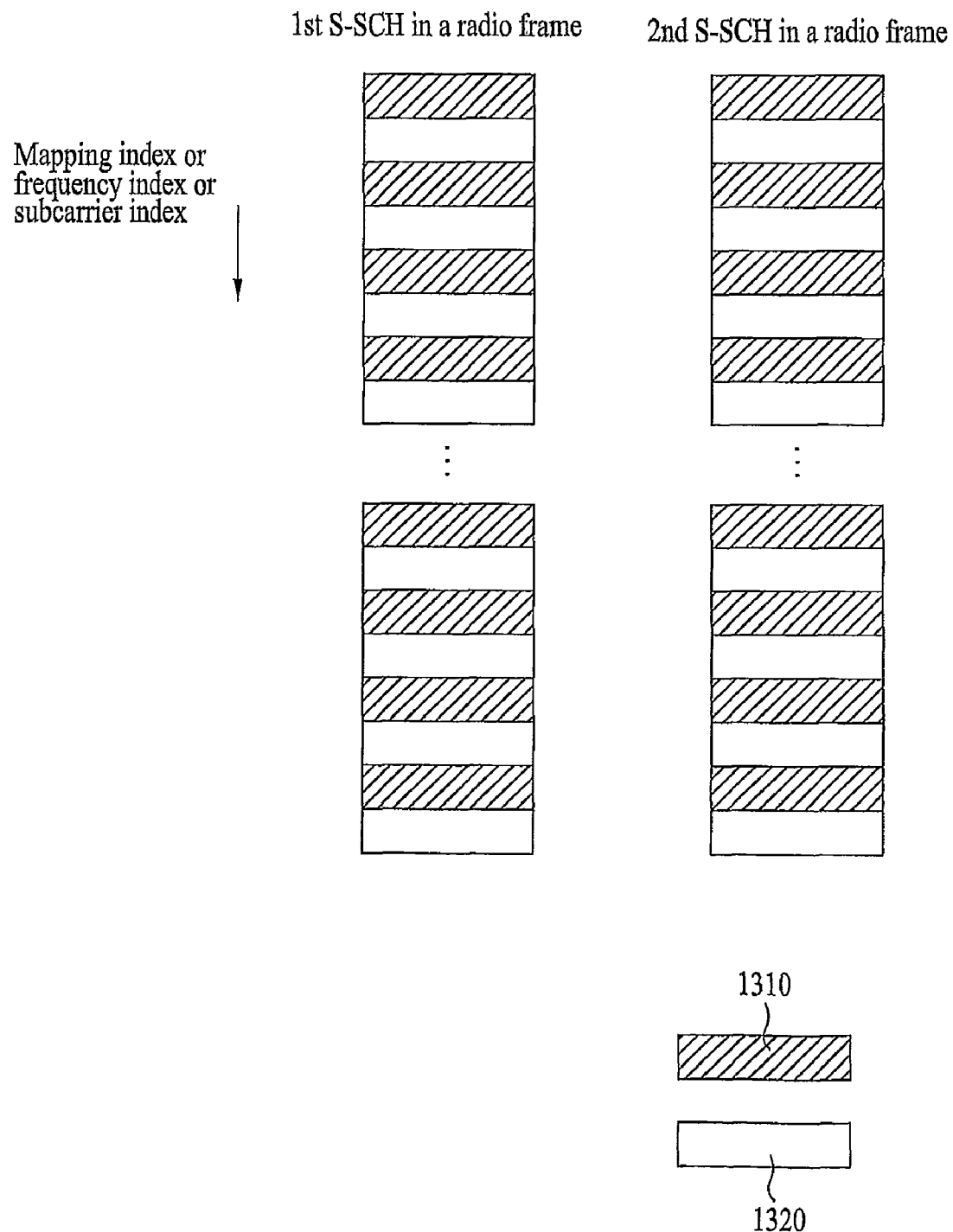
FIG. 15 illustrates an example of applying S-SCH according to the present invention.

FIG. 15 illustrates an example of applying S-SCH according to the present invention. In the structure of FIG. 15, 4 different combination sets may be modulated in region 1310 (hereinafter indicated as "G") and region 1320 (hereinafter indicated as "Y"), i.e., (G,Y)=(1,1), (1,−1), (−1,1), (−1,−1). These 4 combination sets may be used as information indicating the 10 ms P-BCH boundary. Alternatively, when the 4 combination sets can be reduced to 2 combination sets, only a 1-bit information is required to be detected from the SSC. At this point, the possible modulation combinations may include (G,Y)=(1,1), (1,−1) or (G,Y)=(1,1), (−1,1) or (G,Y)=(−1,−1), (1,−1) or (G,Y)=(−1,−1), (−1,1), and so on.

Figure 16:
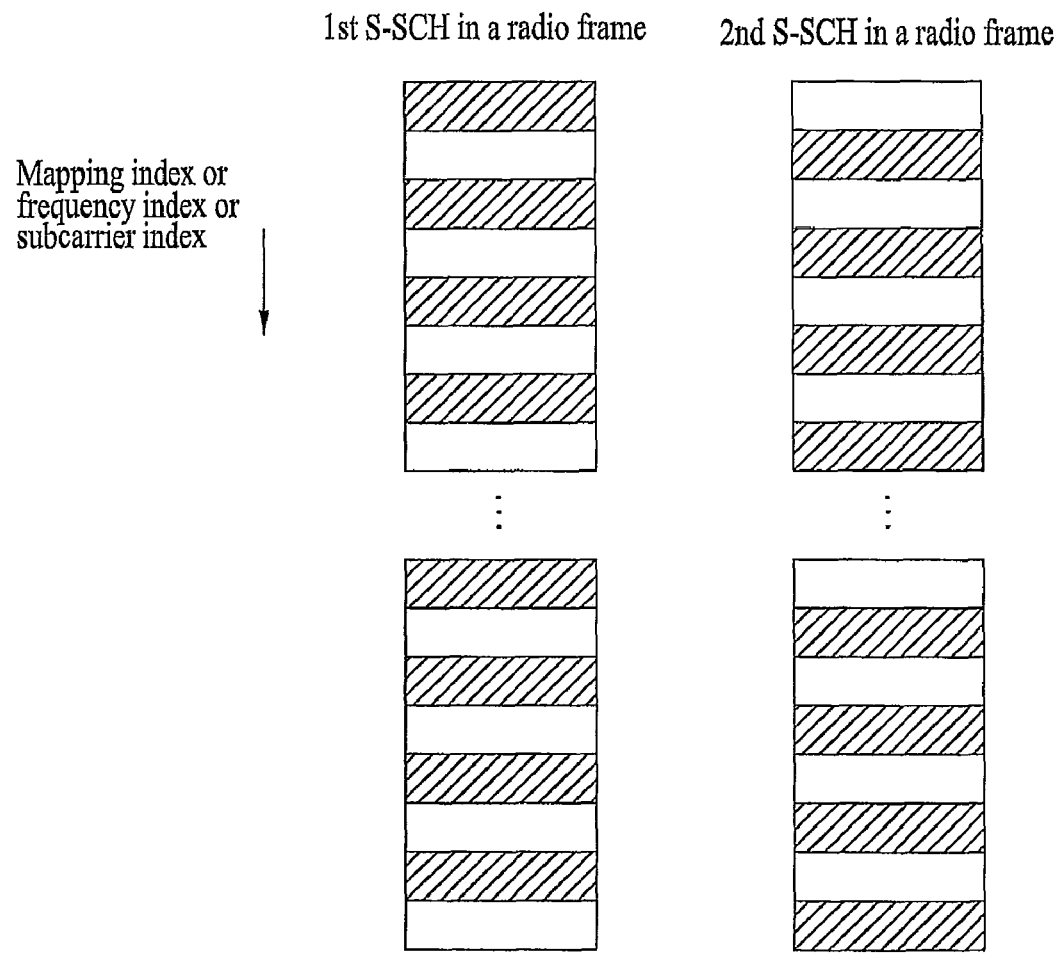
FIG. 16 illustrates a swapped form of S-SCH 2 in comparison with a modulated form of the S-SCH 2 shown in FIG. 15.

Another example of applying the QPSK modulation will now be described. FIG. 16 illustrates a swapped form of S-SCH 2 in comparison with a modulated form of the S-SCH 2 shown in FIG. 15. In the structure of FIG. 15, the combination that may be modulated may include (G,Y)=(1, 1),(j, j), (−1,−1),(−j, −j). This combination also represents a 2-bit information and may indicate the P-BCH boundary information. In the above description, a case where the (G,Y) combination of S-SCH 1 is identical to the (G,Y) combination of S-SCH 2 has been described for simplicity. However, the combination may be altered in accordance to each SCH. For example, when the (G,Y) combination of S-SCH 1 is (1,−1), the (G,Y) combination of S-SCH 2 may become (1,1).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As described above, each embodiment and detailed example of the present invention may be used as methods for transmitting an adequate number of information sets by using a predetermined sequence, and most particularly, by using the S-SCH in a 3GPP LTE system.

However, each of the above-described embodiments of the present invention is not only used in the above-described 3GPP LTE system, but also in a synchronization channel. Furthermore, the above-described embodiments of the present invention may also be applied to an arbitrary telecommunications system (e.g., an IEEE 802.16 series system) wherein a modulation process adequately using a phase rotation may be performed on a sequence having the above-described synchronization channel applied thereto.

What is claimed is:

1. A method for transmitting information using a sequence at a transmitting side of a wireless communication system, the method comprising:
   generating, by the transmitting side, the sequence for transmitting data or control signals;
   performing, by the transmitting side, phase modulation for indicating additional information on partial elements among a plurality of elements configuring the sequence; and
   transmitting, by the transmitting side, the phase modulated sequence to a receiving side,
   wherein the sequence for transmitting data or control signals is generated with respect to a synchronization channel (SCH),
   wherein the plurality of elements configuring the sequence is identified by any one of a mapping index mapped along a frequency axis of the synchronization channel, a frequency index, and a subcarrier index, and
   wherein the partial elements being processed with phase modulation correspond to a predetermined combination of any one of the mapping index mapped along the frequency axis of the synchronization channel, the frequency index, and the subcarrier index, which respectively identify elements configuring the sequence.

2. The method of claim 1, wherein the additional information being indicated through phase modulation comprises at least any one of control information on a frequency hopping of a downlink reference signal, boundary information of a predetermined frame, and antenna configuration information.

3. The method of claim 1, wherein a combination of phase modulations performed on the partial elements corresponding to the predetermined combination is used for transmitting at least any one of the control information on a frequency hopping of a downlink reference signal, boundary information of a predetermined frame, and antenna configuration information.

4. A method for transmitting information using a synchronization channel at a transmitting side of a wireless communication system, the method comprising:
   applying, by the transmitting side, at least one predetermined sequence to each of a first synchronization channel and a second synchronization channel;
   performing, by the transmitting side, phase modulation for indicating additional information on sequence elements corresponding to each of a first region of the first synchronization channel and a second region of the second synchronization channel; and
   transmitting, by the transmitting side to a receiving side, the first synchronization channel and the second synchronization channel each having the respective phase modulated sequence applied thereto,
   wherein the additional information is indicated by using a combination of a first phase modulation value applied to the first region of the first synchronization channel and a second phase modulation value applied to the second region of the second synchronization channel.

5. The method of claim 4,
   wherein, in the applying the at least one predetermined sequence, a different sequence is applied to each of the first synchronization channel and the second synchronization channel, and wherein other additional information is transmitted through a combination of the different sequences each respectively applied to the first synchronization channel and the second synchronization channel.

6. The method of claim 4,
wherein phase modulation is not performed on sequence elements respectively corresponding to a region of the first synchronization channel other than the first region and to a region of the second synchronization channel other than the second region, and
wherein the sequence element corresponding to the region in which the phase modulation is not performed is used by a receiving end as a phase reference.

7. The method of claim 4, wherein, the first phase modulation value and the second phase modulation value are set to enable a receiving end to acquire the additional information by using a differential correlation between the first phase modulation value and the second phase modulation value without any phase reference.

8. The method of claim 4, wherein the synchronization channel corresponds to a secondary synchronization channel (S-SCH).

9. The method of claim 8, wherein the sequence being generated with respect to the secondary synchronization channel includes at least any one of a CAZAC (Constant Amplitude Zero Auto-Correlation) sequence, a Hadamard sequence, a maximum length sequence (M-sequence), a computer search sequence, and a PN sequence.

10. The method of claim 4, wherein the additional information comprises at least any one of control information on a frequency hopping of a downlink reference signal, boundary information of a predetermined frame, and antenna configuration information.

11. A method for transmitting information using a synchronization channel at a transmitting side of a wireless communication system, the method comprising:
applying, by the transmitting side, a predetermined sequence to each of a first synchronization channel and a second synchronization channel;
performing, by the transmitting side, phase modulation for indicating additional information on any one of the first synchronization channel and the second synchronization channel; and
transmitting, by the transmitting side to a receiving side, the first synchronization channel and the second synchronization channel each having the respective phase modulated sequence applied thereto,
wherein the additional information is indicated by using a combination of a first phase modulation value applied to a first region of the first synchronization channel and a second phase modulation value applied to a second region of the second synchronization channel.

* * * * *